US012634302B2

(12) United States Patent (10) Patent No.: US 12,634,302 B2
Wan et al. (45) Date of Patent: May 19, 2026

(54) MALICIOUS TRAFFIC IDENTIFICATION METHOD AND RELATED APPARATUS

(71) Applicants: HUAWEI TECHNOLOGIES CO., LTD., Shenzhen (CN); TSINGHUA UNIVERSITY, Beijing (CN)

(72) Inventors: Rongfei Wan, Beijing (CN); Annan Zhu, Beijing (CN); Jia Zhang, Beijing (CN); Haixin Duan, Beijing (CN)

(73) Assignees: Huawei Technologies Co., Ltd, Shenzhen (CN); TSINGHUA UNIVERSITY, Beijing (CN)

( * ) Notice: Subject to any disclaimer, the term of this patent is extended or adjusted under 35 U.S.C. 154(b) by 376 days.

(21) Appl. No.: 18/345,853

(22) Filed: Jun. 30, 2023

(65) Prior Publication Data

US 2023/0353585 A1 Nov. 2, 2023

Related U.S. Application Data

(63) Continuation of application No. PCT/CN2021/141587, filed on Dec. 27, 2021.

(30) Foreign Application Priority Data

Dec. 31, 2020 (CN) .......................... 202011639885.1
Dec. 21, 2021 (CN) .......................... 202111573232.2

(51) Int. Cl.
*H04L 9/40* (2022.01)
(52) U.S. Cl.
CPC ...... *H04L 63/1416* (2013.01); *H04L 63/1425* (2013.01)
(58) Field of Classification Search
CPC ............. H04L 63/1416; H04L 63/1425; H04L 63/1408; H04L 63/14

(Continued)

(56) References Cited

U.S. PATENT DOCUMENTS 8,676,729 B1 * 3/2014 Keralapura ......... H04L 63/1416
706/12
9,781,139 B2 10/2017 Sofka et al.
(Continued)

FOREIGN PATENT DOCUMENTS

CN 112003824 A 11/2020
EP 3242459 A1 11/2017

OTHER PUBLICATIONS

Resende et al., "HTTP and Contact-Based Features for Botnet Detection," DOI: 10.1002/spy2.41, Department of Computer Science, University of Brasilia, Distrito Federal, Brazil, total 10 pages (May 14, 2018).

(Continued)

*Primary Examiner* — Kaylee J Huang
(74) *Attorney, Agent, or Firm* — Leydig, Voit & Mayer, Ltd.

(57) ABSTRACT

A malicious traffic identification method and a related apparatus are provided. The malicious traffic identification method may include: determining a receiving time of first alarm traffic; obtaining, according to a preset policy, a plurality of pieces of second alarm traffic corresponding to the first alarm traffic within a target time period, where the target time period is a time period determined based on the receiving time, and a similarity between each of the plurality of pieces of second alarm traffic and the first alarm traffic is greater than a preset threshold; performing feature extraction on the plurality of pieces of second alarm traffic to obtain first feature information; and determining, based on the first feature information, whether the first alarm traffic is malicious traffic. According to this present disclosure, accuracy of malicious traffic identification on a live network can be improved by using a multi-flow traceback method.

20 Claims, 12 Drawing Sheets

First service device 001

Network

Second service device 002          Third service device 003

(58) Field of Classification Search
USPC .......................................................... 726/23
See application file for complete search history.

(56) References Cited

U.S. PATENT DOCUMENTS

| | | | |
|---|---|---|---|
| 9,923,912 | B2 | 3/2018 | Franc et al. |
| 9,985,982 | B1 | 5/2018 | Bartos et al. |
| 10,178,107 | B2 | 1/2019 | Havelka et al. |
| 10,187,401 | B2 | 1/2019 | Machlica et al. |
| 10,193,913 | B2 | 1/2019 | Machlica et al. |
| 10,523,609 | B1 | 12/2019 | Subramanian |
| 10,601,851 | B2 * | 3/2020 | Horstmeyer ........... G06N 20/00 |
| 2011/0040706 | A1 * | 2/2011 | Sen ........................ G06N 20/00 |
| | | | 706/12 |
| 2015/0334125 | A1 | 11/2015 | Bartos et al. |
| 2016/0344757 | A1 | 11/2016 | Bartos et al. |
| 2016/0359740 | A1 * | 12/2016 | Parandehgheibi ...... H04L 69/22 |
| 2017/0026394 | A1 | 1/2017 | Bartos et al. |
| 2017/0063892 | A1 | 3/2017 | Bartos et al. |
| 2017/0134404 | A1 | 5/2017 | Machlica et al. |
| 2019/0052656 | A1 | 2/2019 | Sofka |
| 2020/0007561 | A1 * | 1/2020 | Muddu ................. G06F 16/444 |
| 2020/0204569 | A1 | 6/2020 | Komarek et al. |
| 2020/0236131 | A1 * | 7/2020 | Vejman .................. G06N 20/00 |

OTHER PUBLICATIONS

Perdisci et al., "Behavioral Clustering of HTTP-Based Malware and Signature Generation Using Malicious Network Traces," total 14 pages (Apr. 28, 2010).

Mimura et al., "A Practical Experiment of the HTTP-Based RAT Detection Method in Proxy Server Log," 2017 12th Asia Joint Conference on Information Security, total 7 pages, Institute of Electrical and Electronics Engineers, New York, New York (2017).

Lamprakis et al., "Unsupervised Detection of APT C & C Channels using Web Request Graphs," GI International Conference on Detection of Intrusions and Malware and Vulnerability Assessment (DMIVA), total 22 pages (2017).

Gui et al., "Analysis of Malware Application Based on Massive Network Traffic," China Communications, vol. 13, No. 8, XP011622508, total 13 pages (Aug. 2016).

* cited by examiner

First service device 001

Network

Second service
device 002

Third service
device 003

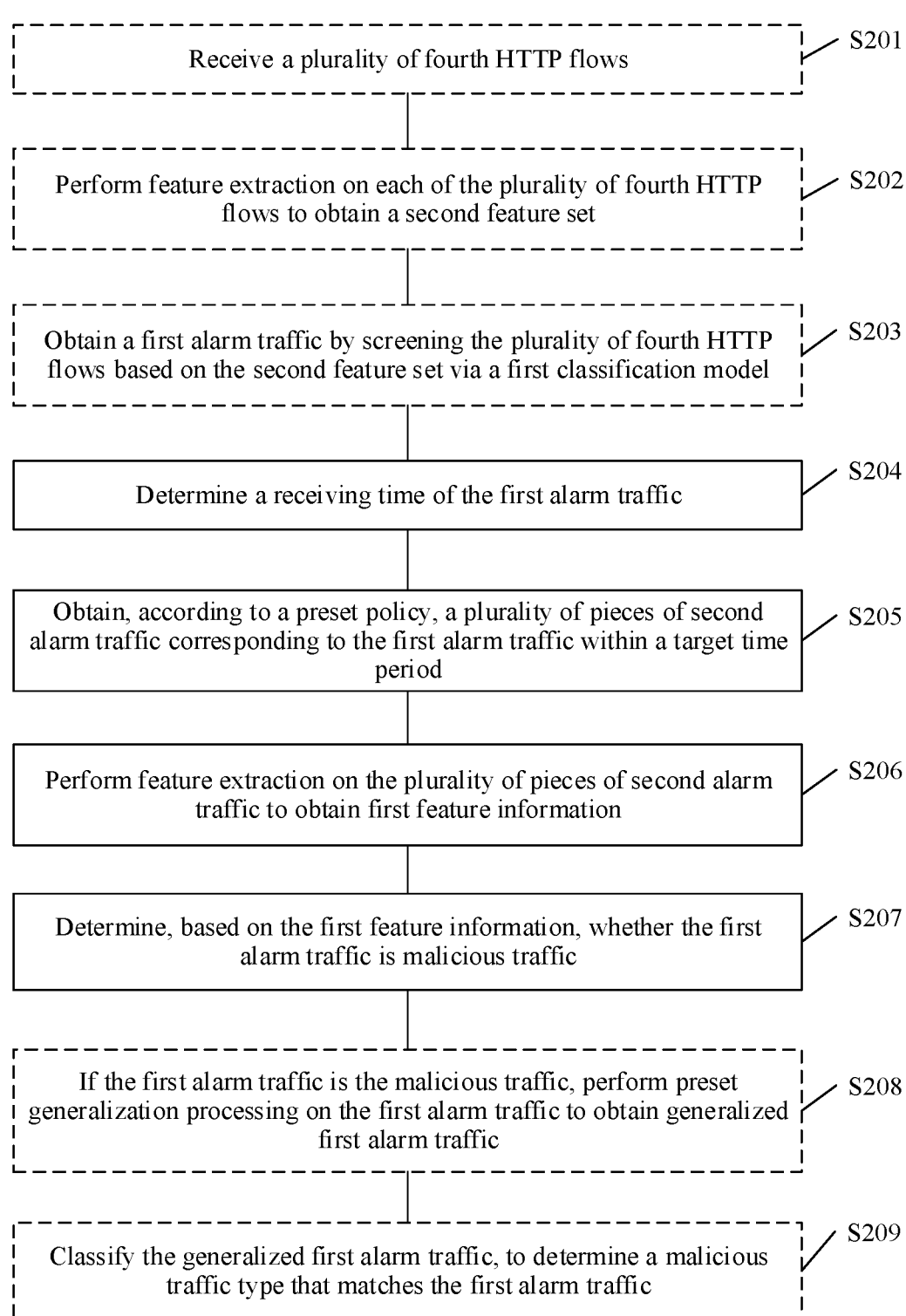

Receive a plurality of fourth HTTP flows — S201

Perform feature extraction on each of the plurality of fourth HTTP flows to obtain a second feature set — S202

Obtain a first alarm traffic by screening the plurality of fourth HTTP flows based on the second feature set via a first classification model — S203

Determine a receiving time of the first alarm traffic — S204

Obtain, according to a preset policy, a plurality of pieces of second alarm traffic corresponding to the first alarm traffic within a target time period — S205

Perform feature extraction on the plurality of pieces of second alarm traffic to obtain first feature information — S206

Determine, based on the first feature information, whether the first alarm traffic is malicious traffic — S207

If the first alarm traffic is the malicious traffic, perform preset generalization processing on the first alarm traffic to obtain generalized first alarm traffic — S208

Classify the generalized first alarm traffic, to determine a malicious traffic type that matches the first alarm traffic — S209

FIG. 2

Figure 8:
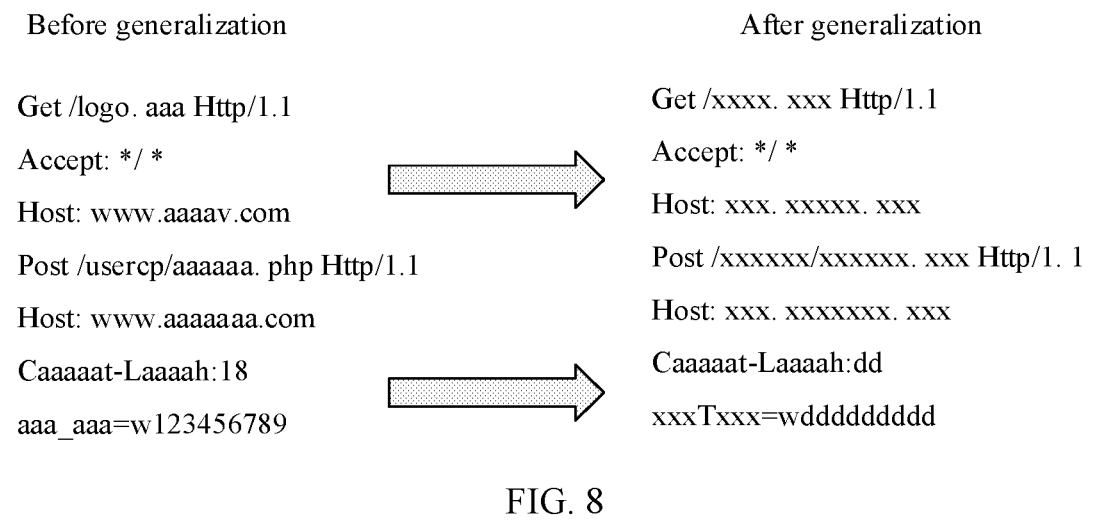

Before generalization

After generalization

Get /logo. aaa Http/1.1

Accept: */ *

Host: www.aaaav.com

Post /usercp/aaaaaa. php Http/1.1

Host: www.aaaaaa.com

Caaaaat-Laaaah:18 aaa_aaa=w123456789

Get /xxxx. xxx Http/1.1

Accept: */ *

Host: xxx. xxxxx. xxx

Post /xxxxxx/xxxxxx. xxx Http/1. 1

Host: xxx. xxxxxxx. xxx

Caaaaat-Laaaah:dd xxxTxxx=wdddddddddd

MALICIOUS TRAFFIC IDENTIFICATION METHOD AND RELATED APPARATUS

CROSS-REFERENCE TO RELATED APPLICATIONS

This application is a continuation of International Application No. PCT/CN2021/141587, filed on Dec. 27, 2021, which claims priority to Chinese Patent Application No. 202011639885.1, filed on Dec. 31, 2020 and Chinese Patent Application No. 202111573232.2, filed on Dec. 21, 2021. All of the aforementioned patent applications are hereby incorporated by reference in their entireties.

STATEMENT OF JOINT RESEARCH AGREEMENT

The subject matter and the claimed invention were made by or on the behalf of Tsinghua University, of Haidian District, Beijing, P.R. China and Huawei Technologies Co., Ltd., of Shenzhen, Guangdong Province, P.R. China, under a joint research agreement titled "Encrypted Traffic Analysis Phase II Project." The joint research agreement was in effect on or before the claimed invention was made, and that the claimed invention was made as a result of activities undertaken within the scope of the joint research agreement.

TECHNICAL FIELD

Embodiments of this present disclosure relate to the field of communication technologies, and in particular, to a malicious traffic identification method and a related apparatus.

BACKGROUND

A hypertext transfer protocol (HTTP), as a most important protocol at present, is widely used in the internet. To facilitate communication and conceal malicious behavior, communication means of various malware, such as a Trojan horse virus, usually use an HTTP communication mode, which mainly refers to communication between a controlled node and a command and control server (CC/C2) of the Trojan horse. Because update iteration of the Trojan horse virus is very fast, communication traffic obtained after update iteration of the Trojan horse virus may obviously differs with previous communication traffic. Currently, there are two ways to detect HTTP malicious traffic: (1) Detection is performed at a traffic layer, that is, detection is performed by extracting a feature in the traffic; and (2) detection is performed based on host behavior, that is, detection is performed by extracting a feature from behavior of an infected host. There are two main methods for processing the extracted feature: (1) an unsupervised clustering-based detection method; and (2) a supervised model-based detection method.

However, whether detection is performed on the feature corresponding to the traffic layer or on the feature corresponding to the host behavior, the unsupervised clustering-based detection method and the supervised model-based detection method each consider only a single-flow feature, that is, a feature of one HTTP flow and do not consider a multi-flow network behavior feature of malicious CC communication, that is, features of a plurality of HTTP flows. In the current detection method, richness of basic information is insufficient, and whether traffic is malicious traffic cannot be effectively and accurately identified. In addition, behavior of much rogue software is similar to feature behavior of CC traffic at a single-flow level. The rogue software cannot be effectively distinguished from the malware by using only a single-flow feature analysis method.

Therefore, how to accurately detect malicious traffic on a live network is a problem to be urgently resolved.

SUMMARY

Embodiments of this disclosure provide a malicious traffic identification method and a related apparatus, to improve accuracy of malicious traffic identification.

According to a first aspect, an embodiment of this disclosure provides a malicious traffic identification method. The method may include:

determining a receiving time of first alarm traffic; obtaining, according to a preset policy, a plurality of pieces of second alarm traffic corresponding to the first alarm traffic within a target time period, where the target time period is a time period determined based on the receiving time, and a similarity between each of the plurality of pieces of second alarm traffic and the first alarm traffic is greater than a preset threshold; performing feature extraction on the plurality of pieces of second alarm traffic to obtain first feature information; and determining, based on the first feature information, whether the first alarm traffic is malicious traffic.

In implementation of the embodiment of the first aspect, a malicious traffic identification apparatus may trace back and obtain, according to a preset policy from a receiving time of a single piece of traffic (that is, the first alarm traffic), a plurality of pieces of traffic (that is, the plurality of pieces of second alarm traffic) that match the single piece of traffic. Then, feature extraction is performed on the plurality of pieces of back-traced traffic to obtain feature information, so that the malicious traffic identification apparatus can classify the foregoing single piece of traffic based on the feature information, to determine whether the single piece of traffic is malicious traffic. All similarities between the plurality of pieces of second alarm traffic and the first alarm traffic each are greater than a preset threshold. In this method for classifying the single piece of traffic based on the feature information of the plurality of pieces of traffic that are similar to the single piece of traffic, when identifying the traffic, the malicious traffic identification apparatus can fully consider a multi-flow network behavior feature of malicious CC communication traffic, to more accurately detect and distinguish malicious traffic on a live network. This avoids accidental detection, caused by a complex traffic situation on the live network, of a single HTTP flow in a detection process in the conventional technology. In addition, in this embodiment of this disclosure, communication behavior of traffic is observed from a perspective of multi-flow, a plurality of alarm flows are traced back to different clusters according to one or more preset policies, statistics collection is performed on feature information of each alarm flow by using a different cluster to which the alarm flow belongs, to determine positivity and negativity based on the feature information (that is, whether the alarm traffic is the malicious traffic), thereby eliminating an accidental error. Overall communication behavior of the malicious traffic within a specific time period is observed, so that a malicious sample can be judged from a perspective of behavior. This makes a final multi-flow judgment result more robust and behavioral explainability. In addition, in this embodiment of this disclosure, for multi-flow traffic, whether detection is performed on a feature corresponding to a traffic layer or a feature corresponding to host behavior, richness of basic information is sufficient for the malicious traffic identification apparatus to effectively and accurately identify whether the traffic is the malicious traffic. Therefore, communication traffic of rogue software and communication traffic of malware can be distinguished from a feature of the multi-flow, thereby improving accuracy of malicious traffic identification.

In a possible implementation, the target time period is a time period of preset duration backward from the receiving time as a start point, or a time period of preset duration forward from the receiving time as an end point. In this embodiment of this disclosure, the receiving time at which the first alarm traffic is received may be used as an endpoint, and a time period of preset duration forward or backward may be used, to ensure that as many pieces of second alarm traffic similar to the first alarm traffic as possible is obtained.

In a possible implementation, the preset policy includes one or more of a first policy, a second policy, and a third policy, the first policy is a policy of obtaining the plurality of pieces of second alarm traffic based on an internet protocol IP address and user agent UA information that are of the first alarm traffic, the second policy is a policy of obtaining the plurality of pieces of second alarm traffic based on the IP address of the first alarm traffic and a preset generalization rule, and the third policy is a policy of obtaining the plurality of pieces of second alarm traffic based on the IP address of the first alarm traffic and hypertext transfer protocol HTTP header information of the first alarm traffic. In this embodiment of this disclosure, in a plurality of traffic traceback manners, a plurality of pieces of traffic that have a same source with the first alarm traffic can be accurately traced back, so that whether the first alarm traffic is the malicious traffic can be identified based on behavior features of the plurality of pieces of traffic, thereby improving accuracy of malicious traffic identification.

In a possible implementation, the preset policy includes the first policy, and the obtaining, according to a preset policy, a plurality of pieces of second alarm traffic corresponding to the first alarm traffic within a target time period includes: obtaining the IP address and the UA information that are of the first alarm traffic; and collecting, as the second alarm traffic, an HTTP flow that has same UA information as the first alarm traffic and that is in a plurality of HTTP flows sent at the IP address within the target time period. In this embodiment of this disclosure, traffic that has a same source IP address and same UA information in first alarm information may be tracked back to a plurality of pieces of traffic sent by a same piece of software, a same service device, or a same application, so that whether the first alarm traffic is the malicious traffic is determined based on behavior features of the plurality of pieces of back-traced traffic, thereby improving accuracy of malicious traffic identification.

In a possible implementation, the preset policy includes the second policy, and the obtaining, according to a preset policy, a plurality of pieces of second alarm traffic corresponding to the first alarm traffic within a target time period includes: obtaining the IP address of the first alarm traffic; collecting a plurality of first HTTP flows sent at the IP address within the target time period; performing generalization processing on the plurality of first HTTP flows according to a preset generalization rule, to obtain a plurality of second HTTP flows, where the preset generalization rule is uniformly replacing, by using a preset standard, a target character string corresponding to each of the plurality of first HTTP flows; and obtaining, as the second alarm traffic, a target second HTTP flow by screening the plurality of second HTTP flows, where a similarity between the target second HTTP flow and the first alarm traffic is greater than the preset threshold. In this embodiment of this disclosure, after generalization, the method for calculating the similarity between the traffic is further used to determine a plurality of pieces of traffic (sent by different applications in a same piece of software) in a same cluster with the first alarm traffic (the similarity exceeds a preset threshold). Further, whether the first alarm traffic is the malicious traffic is determined based on behavior features of the plurality of pieces of traffic, thereby improving accuracy of malicious traffic identification.

In a possible implementation, the preset policy includes the third policy, and the obtaining, according to a preset policy, a plurality of pieces of second alarm traffic corresponding to the first alarm traffic within a target time period includes: obtaining the IP address and the HTTP header information that are of the first alarm traffic; collecting a plurality of third HTTP flows sent at the IP address within the target time period; performing N-gram processing on an HTTP header corresponding to each of the plurality of third HTTP flows, to obtain a first matrix, where the first matrix includes HTTP header sequence information corresponding to each third HTTP flow; performing dimension reduction on the first matrix, and extracting target HTTP header sequence information that matches the HTTP header information of the first alarm traffic and that is in a dimension-reduced first matrix; and obtaining, as the second alarm traffic based on the target HTTP header sequence information, a third HTTP flow corresponding to the target HTTP header sequence information. In this embodiment of this disclosure, in the method for extracting the HTTP header sequence information from the traffic for traceback, a plurality of pieces of traffic sent by different applications in a same piece of software can be tracked back, so that whether the first alarm traffic is the malicious traffic is further determined based on behavior features of the plurality of pieces of traffic, thereby improving accuracy of malicious traffic identification.

In a possible implementation, the first feature information is a feature representation vector, and the performing feature extraction on the plurality of pieces of second alarm traffic to obtain first feature information includes: performing feature extraction on the plurality of pieces of second alarm traffic to obtain behavior feature information corresponding to the plurality of pieces of second alarm traffic, where the behavior feature information includes one or more of a connection behavior feature, a request difference feature, and a request response feature, and obtaining the feature representation vector based on the behavior feature information. In this embodiment of this disclosure, behavior feature extraction is performed on the multi-flow traffic, so that the traffic corresponding to the rogue software and the traffic corresponding to the malware can be well distinguished, thereby improving accuracy of malicious traffic identification.

In a possible implementation, the determining, based on the first feature information, whether the first alarm traffic is malicious traffic includes: performing detection based on the first feature information by using a traceback model, to obtain a first detection result; performing detection based on the plurality of pieces of second alarm traffic by using a baseline model, to obtain a second detection result, where the baseline model is a detection model pre-trained based on historical traffic; and determining, based on the first detection result and the second detection result, whether the first alarm traffic is the malicious traffic. In this embodiment of this disclosure, whether the first alarm traffic is the malicious traffic is finally determined by comprehensively considering the first detection result detected by using the traceback model and the second detection result detected by using the baseline model, thereby greatly improving accuracy of malicious traffic identification.

In a possible implementation, the method further includes: if the first alarm traffic is the malicious traffic, performing preset generalization processing on the first alarm traffic to obtain generalized first alarm traffic; and classifying the generalized first alarm traffic, to determine a malicious traffic type that matches the first alarm traffic. In this embodiment of this disclosure, the generalized first alarm traffic is classified, so that the malicious traffic type that matches the first alarm traffic may be determined, to better maintain network security.

In a possible implementation, before the determining a receiving time of first alarm traffic, the method further includes: receiving a plurality of fourth HTTP flows; performing feature extraction on each of the plurality of fourth HTTP flows to obtain a second feature set, where the second feature set includes second feature information respectively corresponding to the plurality of fourth HTTP flows; and obtaining the first alarm traffic by screening the plurality of fourth HTTP flows based on the second feature set via a first classification model. In this embodiment of this disclosure, the first alarm traffic of suspected malicious traffic is obtained by screening (that is, single-flow filtering) the plurality of fourth HTTP flows via the first classification model and based on a single-flow traffic feature (for example, a manual feature and/or a representation learning feature). This effectively reduces storage and detection of a large quantity of irrelevant data flows during detection, and improves analysis efficiency of the malicious traffic.

In this embodiment of this disclosure, the second feature information includes manual feature information and/or representation learning feature information, the manual feature information includes one or more of a domain name readability feature, a uniform resource locator URL structure feature, a behavior indication feature, and an HTTP header feature that correspond to the fourth HTTP flow, and the representation learning feature information includes a high-dimensional feature corresponding to the fourth HTTP flow. In this embodiment of this disclosure, single-flow filtering may be implemented to extract the first alarm traffic of suspected malicious traffic from the traffic on the live network by identifying the manual feature and/or the representation learning feature corresponding to the traffic, for example, extracting one or more of the domain name readability feature, the uniform resource locator URL structure feature, the behavior indication feature, and the HTTP header feature that correspond to the plurality of fourth HTTP flows, and for another example, extracting high-dimensional features corresponding to the plurality of fourth HTTP flows based on a representation learning model. This improves accuracy of identifying the first alarm traffic of suspected malicious traffic through single-flow filtering, and improves analysis efficiency of the malicious traffic.

According to a second aspect, an embodiment of this disclosure provides a malicious traffic identification apparatus. The apparatus includes:

a determining unit, configured to determine a receiving time of first alarm traffic;

a traceback unit, configured to obtain, according to a preset policy, a plurality of pieces of second alarm traffic corresponding to the first alarm traffic within a target time period, where the target time period is a time period determined based on the receiving time, and a similarity between each of the plurality of pieces of second alarm traffic and the first alarm traffic is greater than a preset threshold;

an extraction unit, configured to perform feature extraction on the plurality of pieces of second alarm traffic to obtain first feature information; and a judging unit, configured to determine, based on the first feature information, whether the first alarm traffic is malicious traffic.

In a possible implementation, the preset policy includes one or more of a first policy, a second policy, and a third policy, the first policy is a policy of obtaining the plurality of pieces of second alarm traffic based on an internet protocol IP address and user agent UA information that are of the first alarm traffic, the second policy is a policy of obtaining the plurality of pieces of second alarm traffic based on the IP address of the first alarm traffic and a preset generalization rule, and the third policy is a policy of obtaining the plurality of pieces of second alarm traffic based on the IP address of the first alarm traffic and hypertext transfer protocol HTTP header information of the first alarm traffic.

In a possible implementation, the preset policy includes the first policy, and the traceback unit is specifically configured to obtain the IP address and the UA information that are of the first alarm traffic; and collect, as the second alarm traffic, an HTTP flow that has same UA information as the first alarm traffic and that is in a plurality of HTTP flows sent at the IP address within the target time period.

In a possible implementation, the preset policy includes the second policy, and the traceback unit is specifically configured to: obtain the IP address of the first alarm traffic; collect a plurality of first HTTP flows sent at the IP address within the target time period; performing generalization processing on the plurality of first HTTP flows according to a preset generalization rule, to obtain a plurality of second HTTP flows, where the preset generalization rule is uniformly replacing, by using a preset standard, a target character string corresponding to each of the plurality of first HTTP flows; and obtain, as the second alarm traffic, a target second HTTP flow by screening the plurality of second HTTP flows, where a similarity between the target second HTTP flow and the first alarm traffic is greater than the preset threshold.

In a possible implementation, the preset policy includes the third policy, and the traceback unit is specifically configured to obtain the IP address and the HTTP header information that are of the first alarm traffic; collect a plurality of third HTTP flows sent at the IP address within the target time period; perform N-gram processing on an HTTP header corresponding to each of the plurality of third HTTP flows, to obtain a first matrix, where the first matrix includes HTTP header sequence information corresponding to each third HTTP flow; perform dimension reduction on the first matrix, and extract target HTTP header sequence information that matches the HTTP header information of the first alarm traffic and that is in a dimension-reduced first matrix; and obtain, as the second alarm traffic based on the target HTTP header sequence information, a third HTTP flow corresponding to the target HTTP header sequence information.

In a possible implementation, the first feature information is a feature representation vector, and the extraction unit is specifically configured to perform feature extraction on the plurality of pieces of second alarm traffic to obtain behavior feature information corresponding to the plurality of pieces of second alarm traffic, where the behavior feature information includes one or more of a connection behavior feature, a request difference feature, and a request response feature; and obtain the feature representation vector based on the behavior feature information.

In a possible implementation, the judging unit is specifically configured to: perform detection based on the first feature information by using a traceback model, to obtain a first detection result; perform detection based on the plurality of pieces of second alarm traffic by using a baseline model, to obtain a second detection result, where the baseline model is a detection model pre-trained based on historical traffic; and determine, based on the first detection result and the second detection result, whether the first alarm traffic is the malicious traffic.

In a possible implementation, the apparatus further includes: a generalization unit, configured to: if the first alarm traffic is the malicious traffic, perform preset generalization processing on the first alarm traffic to obtain generalized first alarm traffic; and a classification unit, configured to classify the generalized first alarm traffic, to determine a malicious traffic type that matches the first alarm traffic.

In a possible implementation, the apparatus further includes an alarm traffic unit, and the alarm traffic unit is configured to: receive a plurality of fourth HTTP flows before the receiving time of the first alarm traffic is determined; perform feature extraction on each of the plurality of fourth HTTP flows to obtain a second feature set, where the second feature set includes second feature information respectively corresponding to the plurality of fourth HTTP flows; and obtain the first alarm traffic by screening the plurality of fourth HTTP flows based on the second feature set via a first classification model.

In this embodiment of this disclosure, the second feature information includes manual feature information and/or representation learning feature information, the manual feature information includes one or more of a domain name readability feature, a uniform resource locator URL structure feature, a behavior indication feature, and an HTTP header feature that correspond to the fourth HTTP flow, and the representation learning feature information includes a high-dimensional feature corresponding to the fourth HTTP flow.

According to a third aspect, an embodiment of this disclosure provides a service device. The service device includes a processor, and the processor is configured to support the service device in implementing a corresponding function in the malicious traffic identification method provided in the first aspect. The service device may further include a memory. The memory is coupled to the processor, and stores program instructions and data that are necessary for the service device. The service device may further include a communication interface, configured to perform communication between the service device and another device or a communication network.

According to a fourth aspect, an embodiment of this disclosure provides a computer-readable storage medium, configured to store computer software instructions used by the malicious traffic identification apparatus provided in the second aspect. The computer storage medium includes a program designed for implementing the foregoing aspects.

According to a fifth aspect, an embodiment of this disclosure provides a computer program. The computer program includes instructions. When the computer program is executed by a computer, the computer is enabled to perform the procedure performed by the malicious traffic identification apparatus in the second aspect.

According to a sixth aspect, this disclosure provides a chip system. The chip system includes a processor, configured to support a terminal device in implementing a function in the first aspect, for example, generating or processing information in the malicious traffic identification method. In a possible design, the chip system further includes a memory, and the memory is configured to store program instructions and data that are necessary for a data sending device. The chip system may include a chip, or may include a chip and another discrete component.

BRIEF DESCRIPTION OF DRAWINGS

To describe the technical solutions in embodiments of this disclosure more clearly, the following briefly describes the accompanying drawings for describing embodiments of this disclosure or the background.

FIG. 2 is a schematic flowchart of a malicious traffic identification method according to an embodiment of this disclosure;

FIG. 8 is a schematic diagram of traffic before and after generalization according to an embodiment of this disclosure;

DESCRIPTION OF EMBODIMENTS

Figure 1:
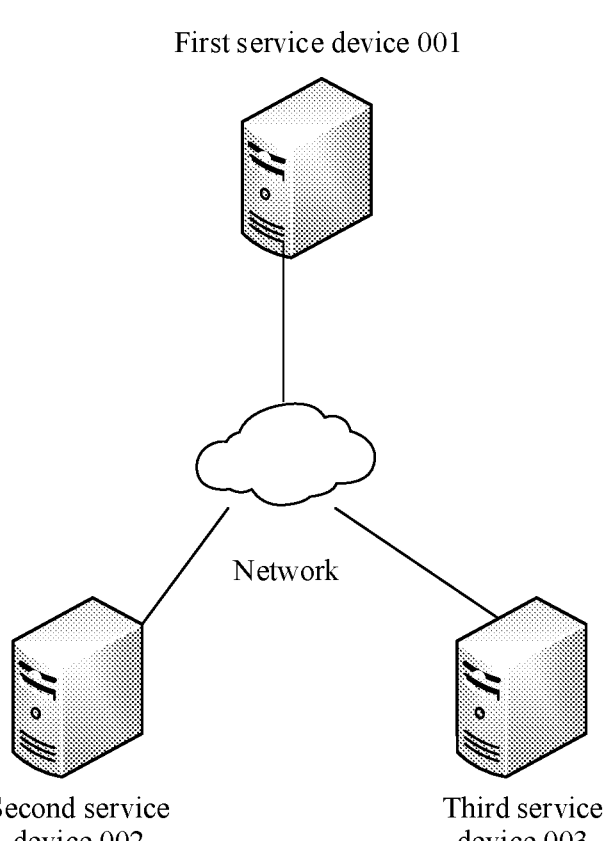
FIG. 1 is a schematic diagram of an architecture of a malicious traffic identification system according to an embodiment of this disclosure.

The following describes embodiments of this disclosure with reference to the accompanying drawings in embodiments of this disclosure.

In the specification, claims, and accompanying drawings of this disclosure, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The following describes the technical solutions in embodiments of this disclosure with reference to the accompanying drawings in embodiments of this disclosure. In this disclosure, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

An "embodiment" in this specification means that a specific feature, structure, or characteristic described with reference to the embodiment may be included in at least one embodiment of this disclosure. The phrase shown in various locations in the specification may not necessarily refer to a same embodiment, and is not an independent or optional embodiment exclusive from another embodiment. It is explicitly and implicitly understood by persons skilled in the art that embodiments described in the specification may be combined with another embodiment.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

Some terms in this disclosure are first described, to help persons skilled in the art have a better understanding.

(1) A hypertext transfer protocol (HTTP) is an application layer protocol used for distributed, collaborative, and hypermedia information systems, is a basis for data communication of the worldwide web, and is also a network transmission protocol most widely used on the internet. The HTTP is originally designed to provide a method for releasing and receiving an HTML page.

(2) A command and control server (CC/C2) of a Trojan horse is a remote command and control server. A target machine can receive a command from the server, so that the server can control the target machine. This method is often used by the Trojan horse virus to control an infected machine.

(3) Internet relay chat (IRC) is an application layer protocol, and is mainly used for group chat. An IRC user uses specific client chat software to connect to an IRC server and communicate with another user connected to the server through a server relay. Therefore, the IRC is short for "internet relay chat".

(4) N-gram, refers to n words that appear consecutively in a text. An n-gram model is a probability language model based on an $(n-1)$ order Markov chain. A structure of a sentence is inferred based on an appearance probability of the n words.

(5) Content-Type, a content type, is generally Content-Type existing in a web page, is used to define a type of a network file and code of the web page, and determine a form and code in which a browser reads the file. That is a reason that some web click results are seen, but a file or picture is downloaded. An attribute of Content-Type specifies a response HTTP content type, or defaults to TEXT/HTML if no Content-Type is specified.

(6) Representation learning is also referred to as learning representation. In the field of deep learning, representation refers to a form and a manner that are used to represent an input observation sample X of a model by using a parameter of the model. Representation learning indicates a valid representation of learning for the observed sample X. A low-dimensional vector representation obtained through representation learning is a distributed representation. It is so named because there is no corresponding clear meaning by separately considering each dimension of a vector, but semantic information of an object can be represented by combining all dimensions to form the vector.

(7) A decision tree is a decision analysis method of constructing, based on known occurrence probabilities of various cases, the decision tree to obtain a probability that an expected value of a net present value is greater than or equal to zero, evaluating a risk of a project, and determining feasibility of the project; and is a graphical method of intuitively using probability analysis. This kind of decision branch is referred to as the decision tree because it is drawn as a graph like branches of a tree. In machine learning, the decision tree is a prediction model that represents a mapping relationship between an object attribute and an object value. A classification tree (the decision tree) is a very common classification method. It is a kind of supervised learning. The supervised learning is that a bunch of samples are given, where each sample has a group of attributes and a type, and these types are predetermined, so that a classifier is obtained through learning, where the classifier can correctly classify a new object. Such machine learning is referred to as the supervised learning.

(8) A user agent (UA) refers to a browser, and further includes a search engine. Its information includes a hardware platform, system software, application software, and a user preference.

(9) A uniform resource locator (URL), also referred to as a web page address, is a standard resource address on the internet. Each file on the internet has a unique URL. Information included in the URL indicates a location of the file and how a browser should handle the URL. The URL was originally invented by Tim Berners-Lee as an address of the worldwide web.

(10) TF-IDF (Term Frequency-Inverse Document Frequency) is a common weighting technology for information retrieval and data mining, and is used to evaluate an importance of a character or word to a file in a file set or in a corpus. The importance of the character or word proportionally increases with increase of an occurrence frequency of the character or word in the file. Meanwhile, the importance decreases with increase of an occurrence frequency of the character or word in the corpus. Various forms of TF-IDF weighting are often used by a search engine as a measure or rating of relevance between a file and a user's query. In addition to the TF-IDF, the search engine on the internet uses a link analysis-based rating method, to determine an order in which the file appears in search results.

(11) A bag-of-words (BOW) model is a common document representation method in an information retrieval field. During information retrieval, for the BOW model, it is assumed that word order, grammar, syntax, and other elements in a document are ignored, and the document is considered as a collection of several words. Each word independently appears in the document without depending on appearing of another word. In other words, any word that appears anywhere in the document is selected independently without being affected by a semantic meaning of the document, that is, order-irrelevant.

(12) An ROC (Receiver Operating Characteristic Curve) is an abbreviation of receiver operating characteristic curve. The ROC curve and an AUC coefficient are mainly used to test an ability of a model to sort customers correctly. The ROC curve describes a proportion of accumulated bad customers under a specific proportion of accumulated good customers. A stronger distinguishing ability of the model indicates a closer ROC curve to the upper left corner. The AUC coefficient represents an area under the ROC curve. A higher AUC coefficient indicates a stronger risk discrimination ability of the model.

(13) A KS (Kolmogorov-Smimov) test is performed mainly to verify an ability of a model to distinguish a breach object. Generally, after predicting credit scores of all samples, the model classifies the samples into a breach part and a non-breach part, and then uses KS statistics to test whether distribution the credit scores of the two groups of samples is significantly different.

Based on the foregoing technical problem, for ease of understanding of embodiments of this disclosure, the following first describes an architecture of a malicious traffic identification system on which embodiments of this disclosure are based. FIG. 1 is a schematic diagram of an architecture of a malicious traffic identification system according to an embodiment of this disclosure. A client in this disclosure may include a first service device 001, a second service device 002, and a third service device 003 in FIG. 1. The first service device 001, the second service device 002, and the third service device 003 may be communicatively connected in a wired or wireless manner. The second service device 002 and the third service device 003 each may send a hypertext transfer protocol (HTTP) request to the first service device.

The first service device 001 may include but is not limited to a background server, a component server, a data processing server, and the like, and is a device that provides various local service programs for a client. In addition, the first service device 001 may receive or respond to a hypertext transfer protocol (HTTP) request sent by one or more service devices, to provide a corresponding application service for another service device. However, the first service device 001 needs to identify whether an HTTP request sent by the another service device is malicious traffic. If the HTTP request is the malicious traffic, to ensure network security, the first service device 001 cannot respond to the HTTP request. Therefore, the first service device 001 is configured with a local service for malicious traffic identification, where the local service may include but is not limited to: determining a receiving time of first alarm traffic; obtaining, according to a preset policy, a plurality of pieces of second alarm traffic corresponding to the first alarm traffic within a target time period, where the target time period is a time period determined based on the receiving time, and a similarity between each of the plurality of pieces of second alarm traffic and the first alarm traffic is greater than a preset threshold; performing feature extraction on the plurality of pieces of second alarm traffic to obtain first feature information; and determining, based on the first feature information, whether the first alarm traffic is malicious traffic.

The second service device 002 may also include but is not limited to a background server, a component server, a data processing server, and the like, and is a device that provides various local service programs for the client. A related application may be installed and run, and an HTTP request may be sent to the first service device, so that the first service device obtains a corresponding service after responding.

The third service device 003 may be a command and control server (CC/C2) of a Trojan horse. Another service device may receive a command from the third service device 003 (CC server), to achieve an objective of controlling the foregoing service device by the third service device 003. This is commonly used in an infected service device controlled by the Trojan horse virus. For example, in this embodiment of this disclosure, the third service device 003 may send an HTTP request to the first service device, so that the first service device receives an HTTP flow, and the HTTP flow can be identified as malicious traffic by the first service device.

It may be understood that the network architecture in FIG. 1 is merely an example of an implementation in embodiments of this disclosure, and an architecture of the malicious traffic identification system in embodiments of this disclosure includes but is not limited to the foregoing architecture of the malicious traffic identification system.

Based on the architecture of the malicious traffic identification system provided in FIG. 1 and the malicious traffic identification method provided in this disclosure, the technical problem proposed in this disclosure is specifically analyzed and resolved.

FIG. 2 is a schematic flowchart of a malicious traffic identification method according to an embodiment of this disclosure. The method may be applied to the architecture of the malicious traffic identification system shown in FIG. 1. The first service device 001 may be configured to support and perform step S201 to step S209 in the method procedure shown in FIG. 2. The following describes the method from the first service device with reference to FIG. 2. The method may include the following steps S201 to S209.

Step S201: Receive a plurality of fourth HTTP flows.

Specifically, a malicious traffic identification apparatus receives the plurality of fourth hypertext transfer protocol HTTP flows. The fourth HTTP flow may be a hypertext transfer protocol HTTP flow that is sent by one or more second service devices and/or third service devices and that is received by the first service device.

Step S202: Perform feature extraction on each of the plurality of fourth HTTP flows to obtain a second feature set.

Figure 3:
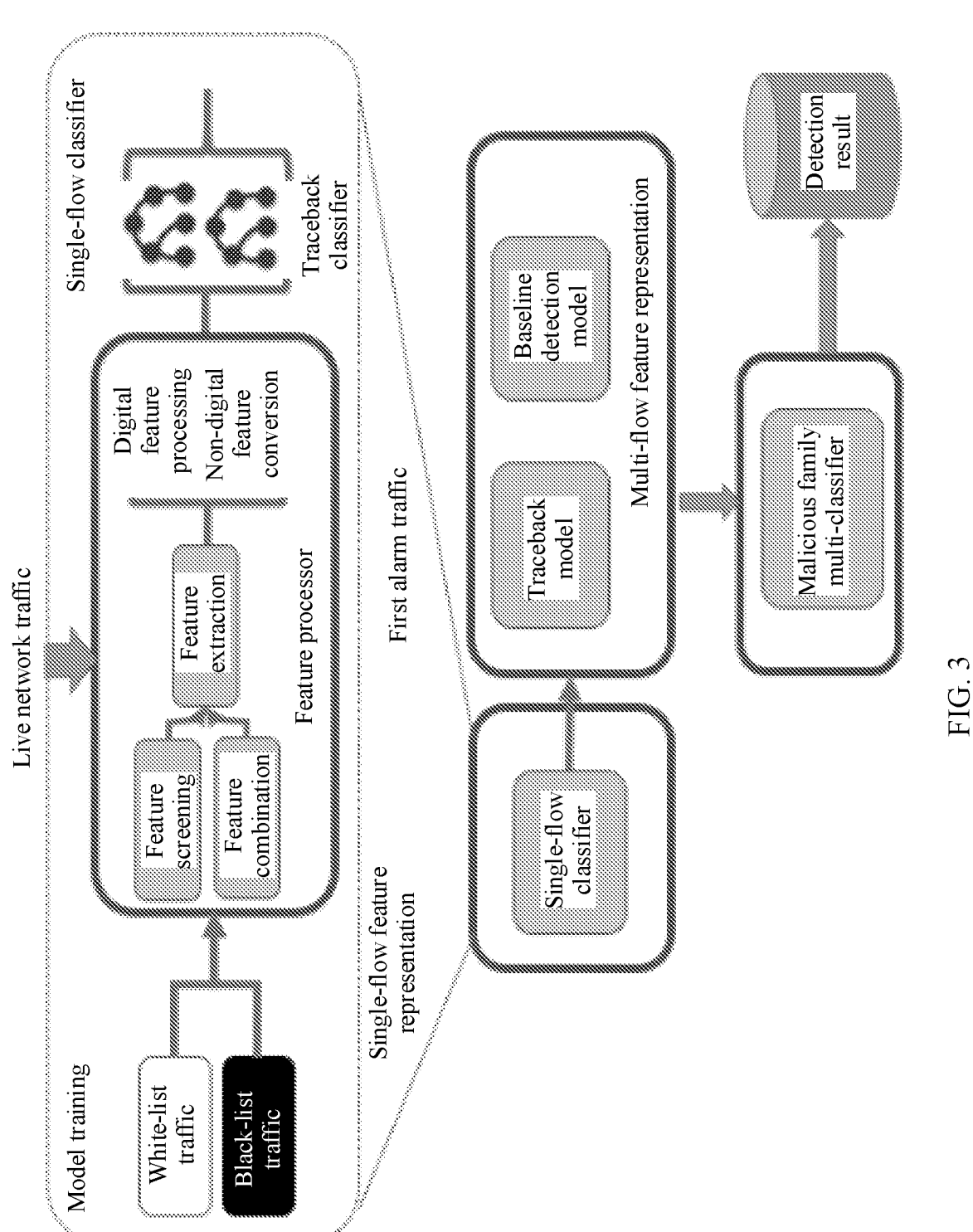
FIG. 3 is a schematic diagram of a framework for malicious traffic identification according to an embodiment of this disclosure.

Specifically, the malicious traffic identification apparatus performs feature extraction on each of the plurality of fourth HTTP flows to obtain the second feature set, where the second feature set includes second feature information respectively corresponding to the plurality of fourth HTTP flows. It may be understood that, for all the fourth HTTP flows, the first service device 001 may perform feature extraction according to a preset feature extraction rule, and then obtain corresponding non-digital feature vectors and other digital feature vectors. These non-digital feature vectors and the other digital feature vectors are concatenated according to a unified rule, to obtain a final single-flow feature vector, that is, the second feature information corresponding to the fourth HTTP flows. FIG. 3 is a schematic diagram of a framework for malicious traffic identification according to this embodiment of this disclosure. As shown in FIG. 3, in this embodiment of this disclosure, a single-flow classifier classifies live network traffic (feature processing and single-flow classification are performed based on a model trained by using a plurality of pieces of black-list traffic and white-list traffic), to obtain first alarm traffic of suspected malicious traffic. For example, on the basis of single-flow data traffic, a feature processor performs feature extraction to extract a single-flow feature in the traffic to form a feature vector, and inputs such feature vector into a classifier to preliminarily determine whether the traffic is CC communication traffic of malware (that is, the first alarm traffic); performs multi-flow feature extraction based on the first alarm traffic to obtain a multi-flow feature representation (multi-flow traceback); and finally determines, based on the multi-flow feature representation, by using a traceback model and a baseline model, whether the first alarm traffic is the malicious traffic. In addition, a type of the first alarm traffic may be finally determined by a malicious family classifier by using the feature extracted by the foregoing model. For a specific implementation, refer to the following steps. Details are not described herein again in this embodiment of this disclosure.

Optionally, the second feature information includes manual feature information and/or representation learning feature information, the manual feature information includes one or more of a domain name readability feature, a uniform resource locator URL structure feature, a behavior indication feature, and an HTTP header feature that correspond to the fourth HTTP flow, and the representation learning feature information includes a high-dimensional feature corresponding to the fourth HTTP flow.

Figure 4:
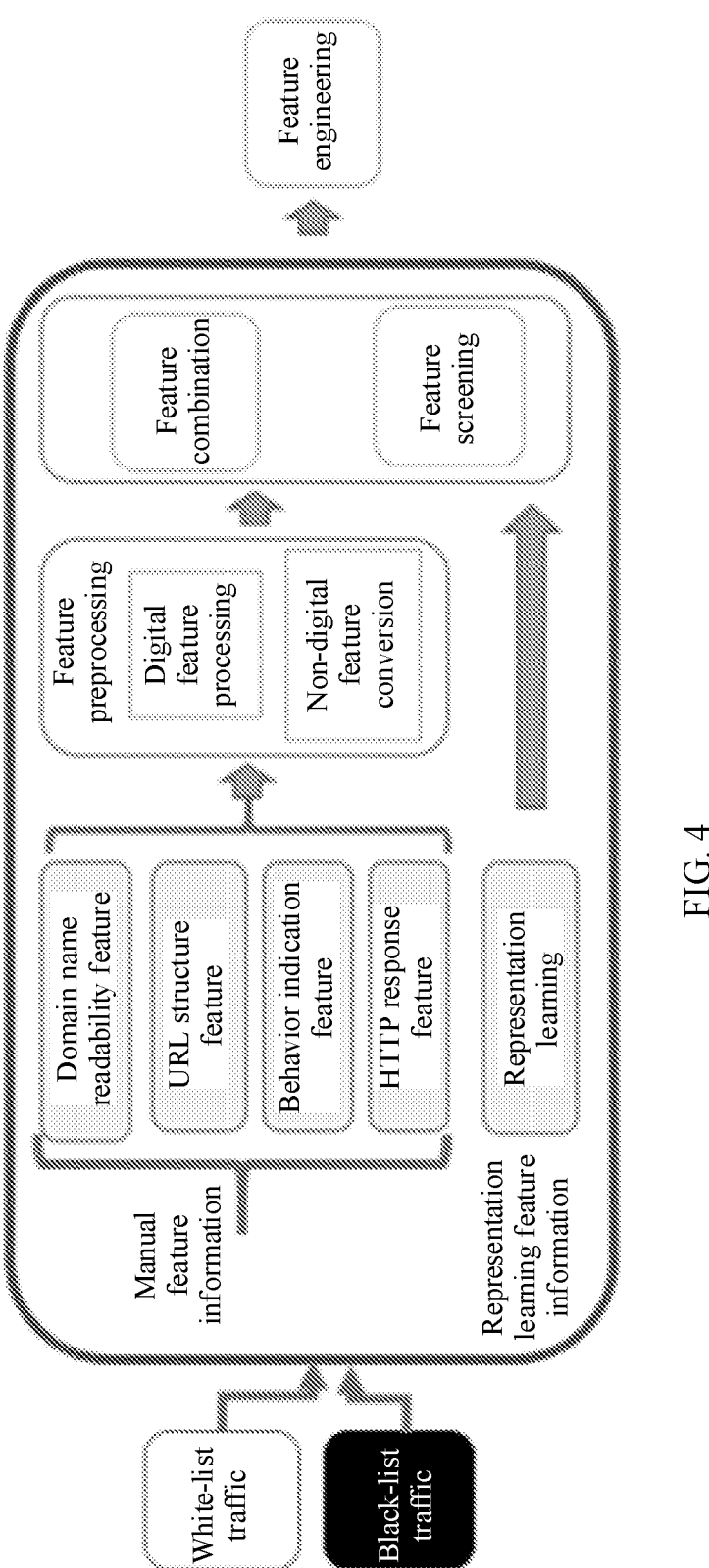
FIG. 4 is a schematic diagram of feature extraction according to an embodiment of this disclosure.

For example, FIG. 4 is a schematic diagram of feature extraction according to this embodiment of this disclosure. As shown in FIG. 4, for the plurality of received fourth HTTP flows, a manual feature may be extracted by using a feature engineering method and feature extraction is performed in a representation learning manner. (1) The manual feature information includes one or more of the following features: the domain name readability feature, the uniform resource locator URL structure feature, the behavior indication feature, and the HTTP header feature (an HTTP response feature) that correspond to the fourth HTTP flow. A URL statistical feature includes one or more of the following features: a length, a vowel ratio, a consonant ratio, a special character ratio, an uppercase letter ratio, a lowercase letter ratio, a digit ratio, a quantity of domain name levels, domain name character distribution, a top-level domain name, a path length, a quantity of path layers, a file name extension, a quantity of parameters, an average length of parameter values, whether base64 exists, and whether a common mode is followed. The HTTP header feature includes one or more of the following features: a content type, a user agent (UA), HTTP return status code, and N-gram of a header sequence. (2) The representation learning feature information is extracting a high-dimensional feature of the fourth HTTP flow before a neural network output layer by using a representation learning manner as an assistant, maximally performing feature extraction on an existing data set, and performing association in a high dimension. White-list traffic shown in FIG. 4 is normal traffic, and black-list traffic is malicious traffic. Feature extraction (manual feature extraction and representation learning feature extraction) is performed on each of the plurality of fourth HTTP flows, extracted features are preprocessed (for example, digital feature processing and non-digital feature conversion), and the features are combined and screened to obtain the second feature set.

Optionally, the performing feature extraction on each of the plurality of fourth HTTP flows to obtain a second feature set includes: performing feature extraction on each of the plurality of fourth HTTP flows to obtain an initial feature set; and performing text processing on a non-digital feature in the initial feature set, to obtain the second feature set. It should be noted that, because a classification model generally processes digital inputs, text-to-digital conversion needs to be performed on a text feature or a non-digital feature in features, to convert the text feature or the non-digital feature into a digital vector that can be processed by the classification model. A manner of performing feature extraction on each of the plurality of fourth HTTP flows may be the manual feature extraction and/or the representation learning feature extraction.

Optionally, the foregoing related text feature includes but is not limited to: a top-level domain name, a file suffix, Content-Type, a UA, and the like. It may be understood that, because inputs of four field features each are a character string, and a machine learning classifier cannot process the character string, the character string needs to be converted to a digital vector that can be processed by the classification model. The method used in the above text processing process is TF-IDF. In the TF-IDF, "term frequency" (TF) satisfies TF=quantity of appearance times of a word in an article, and indicates an appearance frequency of a word in a document. "Inverse document frequency" (IDF) satisfies IDF=quantity of appearance times of a word in an article/total quantity of words in an article, and indicates an inverse ratio of commonness of the word. This can effectively solve some words that appear frequently but do not have much meaning. In this embodiment of this disclosure, a method of TF-IDF=TF*IDF may be used to effectively reflect an appearance frequency of a character string in a field in the traffic. For example, first, TF-IDF conversion is performed on these features, and their vector representations are calculated based on the term frequency and a document order. It should be noted that, in a classification and identification process, data processed by using the TF-IDF needs to be compared with a basic TF-IDF library of a detection model to detect an exception, and the basic TF-IDF library may be obtained through statistic collection by using the white-list traffic (which may be normal data traffic that can be determined and identified by using some technical means and that is for model training or correctness verification) in a training process, and may be generated by using specific white-list traffic in a specific detection scenario.

In a possible implementation, the performing text processing on a non-digital feature in the initial feature set, to obtain the second feature set includes: performing text processing on the non-digital feature in the initial feature set, to obtain a digital feature vector set; and performing dimension reduction on the foregoing digital feature vector set, to obtain the second feature set. It may be understood that, after TF-IDF processing is performed on the extracted initial feature set, an obtained vector dimension is high. In this case, for the classification model and subsequent processing, a high-dimensional vector consumes more resources, and processing efficiency is low. Therefore, dimension reduction may be performed to convert such a high-dimensional vector into low-dimensional vector space. The dimension reduction method may include but is not limited to singular value decomposition (SVD), principal component analysis (PCA), and the like. For example, in this embodiment of this disclosure, because the vector dimension obtained through TF-IDF calculation is excessively high, dimension explosion is prone to occur. Therefore, a dimension reduction operation is performed to reduce the vector obtained through TF-IDF processing from high-dimensional space to 10-dimensional space.

Optionally, features extracted by using different methods for each fourth HTTP flow are combined and screened, to obtain second feature information corresponding to the fourth HTTP flow. For example, a feature engineering feature and a representation learning feature are combined, and a feature set with optimal effect and corresponding to each fourth HTTP flow is obtained through screening according to a feature selection algorithm such as a minimum redundancy maximum correlation (mRMR). As shown in FIG. 4, in this embodiment of this disclosure, a single-flow traffic feature is extracted from live network traffic, text processing is performed on the non-digital feature, and traffic features are combined and screened to obtain the second feature set.

Step S203: Obtain the first alarm traffic by screening the plurality of fourth HTTP flows based on the second feature set via a first classification model.

Specifically, the malicious traffic identification apparatus may obtain the first alarm traffic by screening the plurality of fourth HTTP flows based on the second feature set via the first classification model. The first alarm traffic is traffic on which suspected malicious traffic is obtained by screening the plurality of fourth HTTP flows via the first classification model. For example, an obtained traffic feature vector (that is, the second feature information) of each fourth HTTP flow is input into the first classification model. The first classification model may train different classifiers based on different features in a stack mode for determining. The first classification model may be used to finally obtain an HTTP session-based first-layer detection result by using a decision tree mechanism based on a determining result of each classifier. In addition, the first classification model may be a model obtained through training by using a marked training dataset of black-list traffic and white-list traffic. The preprocessing of data implements initial screening of normal traffic. On this basis, for single-flow data traffic, a composite feature is extracted and selected based on manual experience and representation learning methods to form a single-flow feature vector, and then such feature vector is input into the classifier, to first determine whether the traffic is CC communication traffic of suspected malware. If the traffic is CC communication traffic of suspected malware, a next step of determining is further performed. This greatly improves efficiency of determining whether the traffic is the malicious traffic.

Step S204. Determine a receiving time of the first alarm traffic.

Specifically, the malicious traffic identification apparatus determines the receiving time of the first alarm traffic. After the first alarm traffic is obtained through screening, the receiving time of the first alarm traffic may be determined, to trace back a plurality of pieces of traffic.

Step S205: Obtain, according to a preset policy, a plurality of pieces of second alarm traffic corresponding to the first alarm traffic within a target time period.

The malicious traffic identification apparatus obtains, according to the preset policy, the plurality of pieces of second alarm traffic corresponding to the first alarm traffic within the target time period. The target time period is a time period determined based on the receiving time, and a similarity between each of the plurality of pieces of second alarm traffic and the first alarm traffic is greater than a preset threshold. During the detection, a traffic situation on the live network is complex. Therefore, detection on a single HTTP flow is accidental to some extent. If communication behavior of a malicious sample can be observed from a perspective of a plurality of flows, a plurality of requests can be traced back to different clusters based on different methods. Statistical feature combination of a different cluster to which each alarm flow belongs is used to determine positivity and negativity, thus eliminating an accidental error. That is, overall communication behavior of the malicious sample within a specific time period is observed, so that the malicious sample can be accurately judged from a perspective of behavior. This makes a final multi-flow result more robust and behavioral explainability.

Optionally, the target time period is a time period determined based on the receiving time. For example, the target time period is a time period of preset duration backward from the receiving time as a start point, or a time period of preset duration forward from the receiving time as an end point. For another example, the target time period may alternatively be a time period including the receiving time. The second alarm traffic is obtained near the received first alarm traffic, to ensure that as many pieces of second alarm traffic similar to the first alarm traffic as possible are obtained.

Optionally, the preset policy includes one or more of a first policy, a second policy, and a third policy, the first policy is a policy of obtaining the plurality of pieces of second alarm traffic based on an internet protocol IP address and user agent UA information that are of the first alarm traffic, the second policy is a policy of obtaining the plurality of pieces of second alarm traffic based on the IP address of the first alarm traffic and a preset generalization rule, and the third policy is a policy of obtaining the plurality of pieces of second alarm traffic based on the IP address of the first alarm traffic and hypertext transfer protocol HTTP header information of the first alarm traffic. On the basis of the original detection method, after the first classification model reports a result, CC communication traffic within a period of time forward and/or backward based on the first alarm traffic is collected by using a traffic traceback method, and then multi-flow feature extraction is performed. It may be understood that, the first policy is tracing back, based on the IP address and the UA information that are of the first alarm traffic, to a plurality of pieces of traffic sent by a same piece of software, a same service device, or a same application. The second policy is tracing back a plurality of pieces of traffic based on the IP address of the first alarm traffic, and then generalizing back-traced traffic according to a preset generalization rule, to obtain, through screening, a plurality of pieces of traffic sent by different applications of same piece of software as the first alarm traffic. The third policy is tracing back, based on the IP address and the HTTP header information that are of the first alarm traffic, to a plurality of pieces of traffic sent by different applications in the same piece of software. In a plurality of traffic traceback manners, a plurality of pieces of traffic that have a same source as the first alarm traffic can be accurately traced back, so that whether the first alarm traffic is the malicious traffic can be identified based on behavior features of the plurality of pieces of traffic, thereby improving accuracy of malicious traffic identification.

Figure 5:
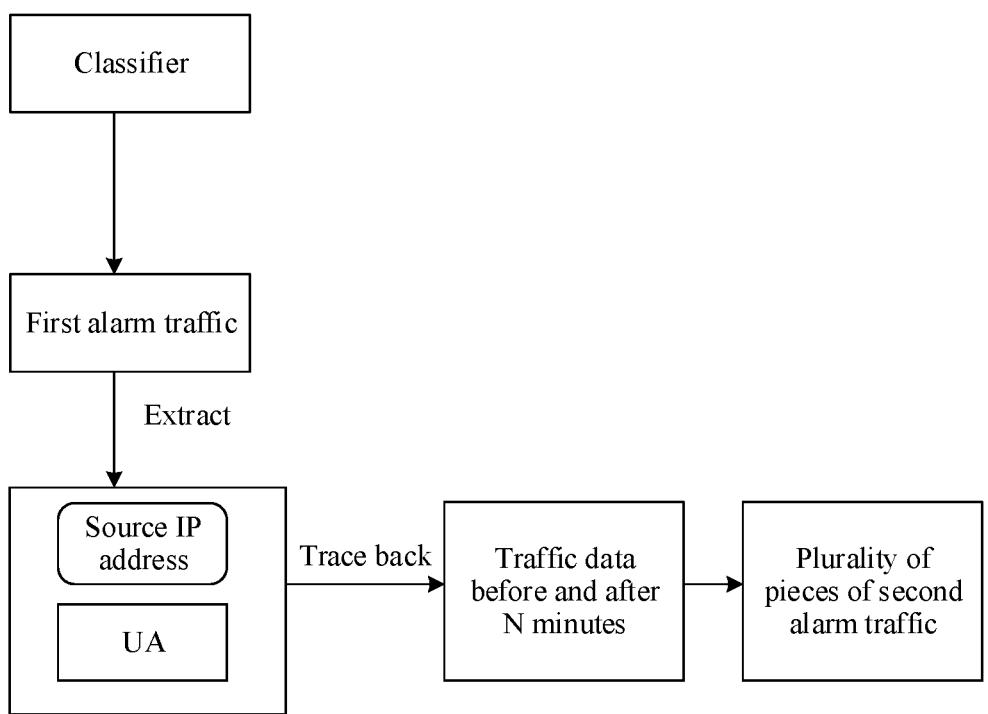
FIG. 5 is a schematic flowchart of tracing back traffic according to a first policy according to an embodiment of this disclosure.
Figure 6:
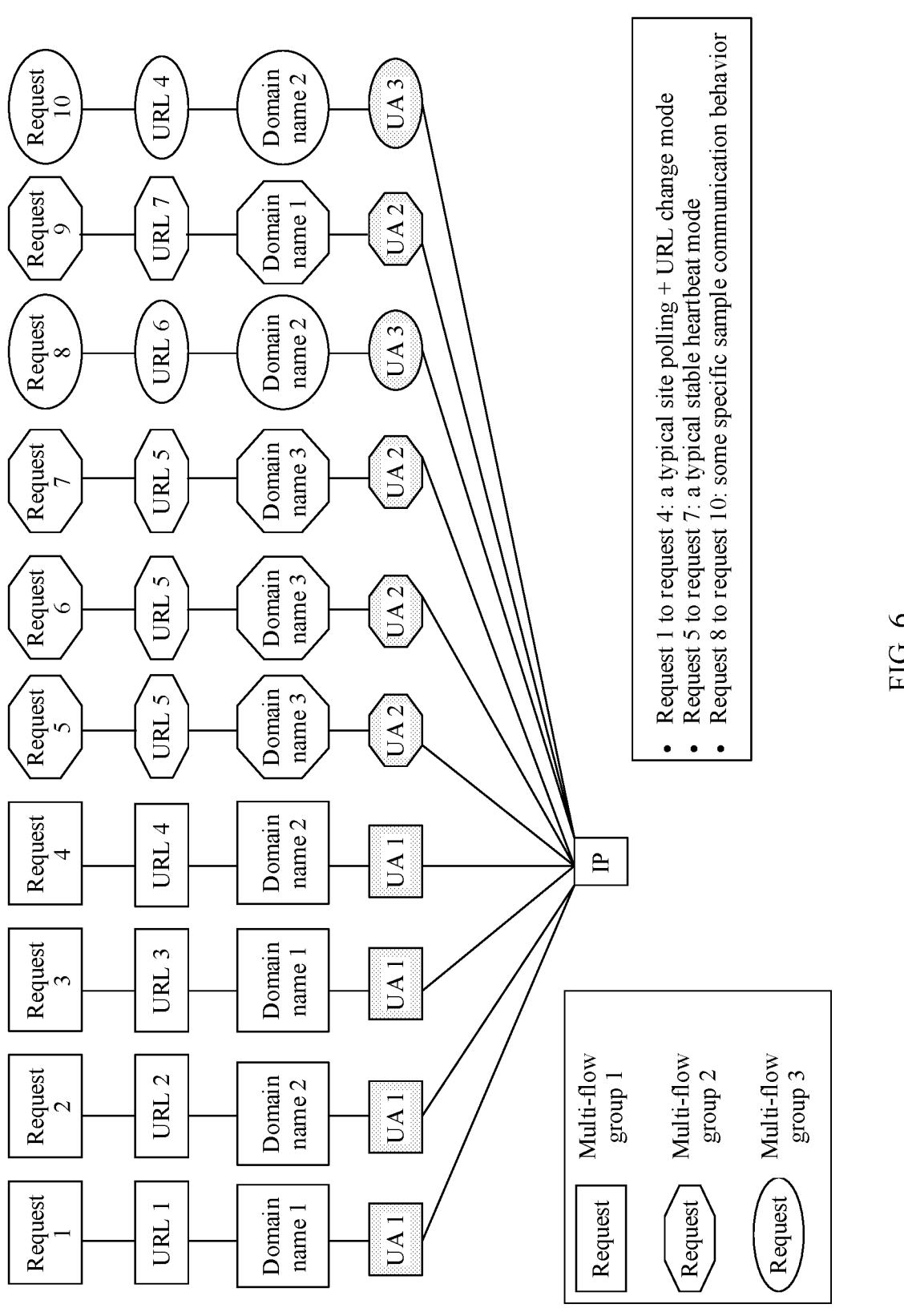
FIG. 6 is a schematic diagram of a plurality of pieces of traffic traced back according to a first policy according to an embodiment of this disclosure.

Optionally, the preset policy includes the first policy, and the obtaining, according to a preset policy, a plurality of pieces of second alarm traffic corresponding to the first alarm traffic within a target time period includes: obtaining the IP address and the UA information that are of the first alarm traffic; and collecting, as the second alarm traffic, an HTTP flow that has same UA information as the first alarm traffic and that is in a plurality of HTTP flows sent at the IP address within the target time period. FIG. 5 is a schematic flowchart of tracing back traffic according to a first policy according to an embodiment of this disclosure. As shown in FIG. 5, if the preset policy includes the first policy, that is, the UA information and the source IP address information of the first alarm traffic may be used as a unique index for traffic traceback, application traffic identification is performed by using UA header information, and traceback analysis is performed by extracting, as the second alarm traffic, all HTTP flows of same UA information sent at N minutes before or after the source IP address (src-ip) is sent. In this manner, the plurality of pieces of traffic sent by the same piece of software, the same service device, or the same application can be traced back, thereby improving accuracy of malicious traffic identification. FIG. 6 is a schematic diagram of a plurality of pieces of traffic traced back according to a first policy according to an embodiment of this disclosure. As shown in FIG. 6, 10 HTTP requests are traced back based on three pieces of first alarm traffic and according to the first policy. The 10 HTTP requests are totally grouped into three groups based on the IP address information and the UA information, and the three groups respectively correspond to the three pieces of first alarm traffic. A multi-flow group 1 corresponds to first alarm traffic whose IP address is IP and UA information is UA 1. A multi-flow group 2 corresponds to first alarm traffic whose IP address is IP and UA information is UA 2. A multi-flow group 3 corresponds to first alarm traffic whose IP address is IP and UA information is UA 3. In addition, an HTTP request 1 to an HTTP request 4 correspond to a typical site polling+URL change mode. An HTTP request 5 to an HTTP request 7 correspond to a typical stable heartbeat mode. An HTTP request 8 to an HTTP request 10 correspond to some specific sample communication behavior.

Figure 7:
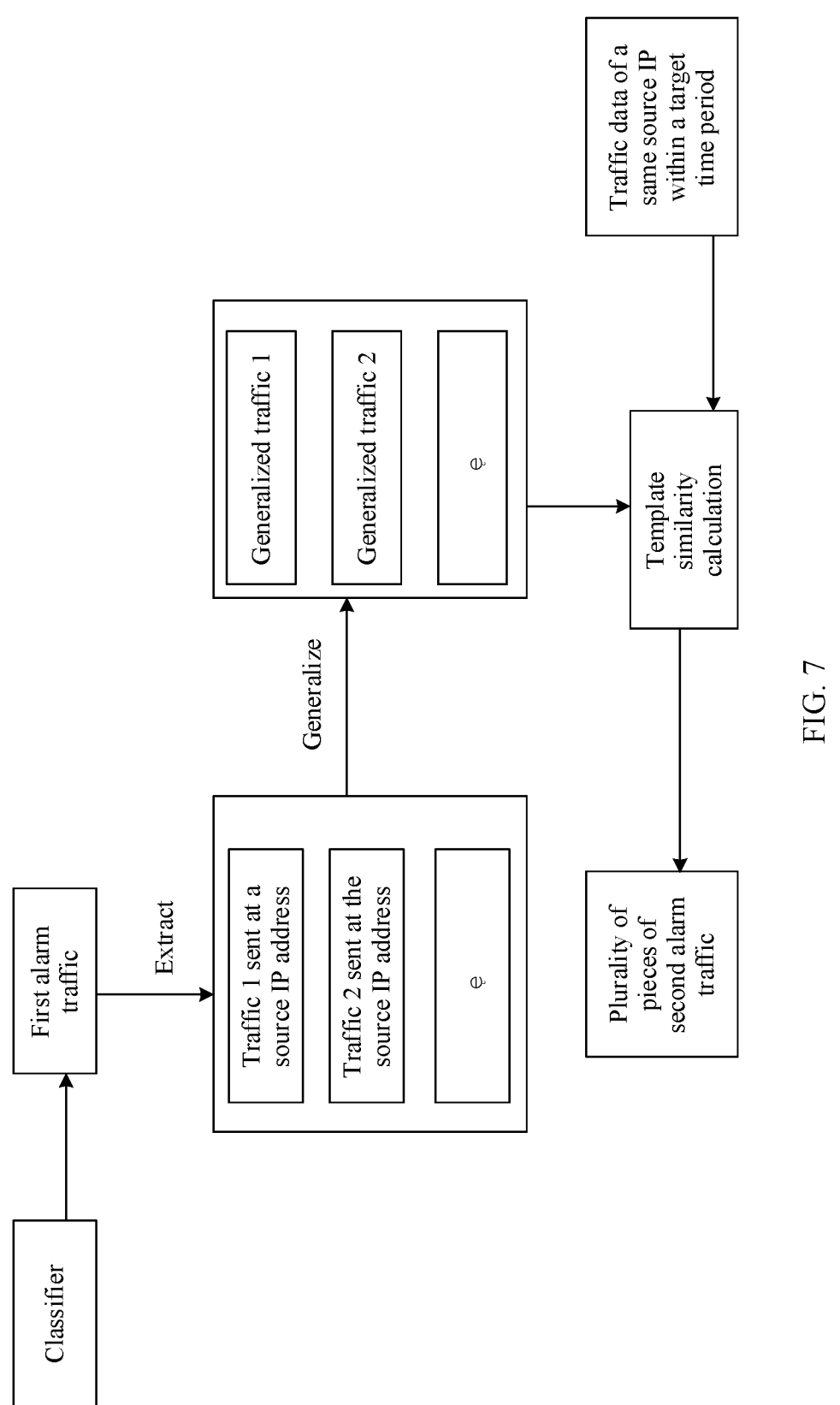
FIG. 7 is a schematic flowchart of tracing back traffic according to a second policy according to an embodiment of this disclosure.

Optionally, the preset policy includes the second policy, and the obtaining, according to a preset policy, a plurality of pieces of second alarm traffic corresponding to the first alarm traffic within a target time period includes: obtaining the IP address of the first alarm traffic; collecting a plurality of first HTTP flows sent at the IP address within the target time period; performing generalization processing on the plurality of first HTTP flows according to a preset generalization rule, to obtain a plurality of second HTTP flows, where the preset generalization rule is uniformly replacing, by using a preset standard, a target character string corresponding to each of the plurality of first HTTP flows; and obtaining, as the second alarm traffic, a target second HTTP flow by screening the plurality of second HTTP flows, where a similarity between the target second HTTP flow and the first alarm traffic is greater than the preset threshold. FIG. 7 is a schematic flowchart of tracing back traffic according to a second policy according to an embodiment of this disclosure. As shown in FIG. 7, formed traffic is generalized, and a changed field of the traffic is replaced with a character. Traffic sent from a same source IP is generalized in a unified manner, and a character string similarity between templates is calculated. In this way, all most similar HTTP flows are matched from historical traffic of the source IP (for example, traffic data of the same source IP within a target time period), that is, the second alarm traffic. Generalization is to replace a position of the changed string in the traffic according to a same standard (for example, in this embodiment of this disclosure, a lowercase letter may be replaced with x, a special character may be replaced with T, and an uppercase letter may be replaced with X). FIG. 8 is a schematic diagram of traffic before and after generalization according to an embodiment of this disclosure. As shown in FIG. 8, after a plurality of first HTTP flows are generalized according to a unified generalization rule, second HTTP flows respectively corresponding to the plurality of first HTTP flows are obtained. Further, similarities between the plurality of second HTTP flows and the first alarm traffic may be calculated. After generalization, the method for calculating the similarity between the traffic is further used to determine a plurality of pieces of traffic (sent by different applications in a same piece of software) in a same cluster with the first alarm traffic (the similarity exceeds a preset threshold). Further, whether the first alarm traffic is the malicious traffic is determined based on behavior features of the plurality of pieces of traffic, thereby improving accuracy of malicious traffic identification.

Optionally, the obtaining, as the second alarm traffic, a target second HTTP flow by screening the plurality of second HTTP flows, where a similarity between the target second HTTP flow and the first alarm traffic is greater than the preset threshold includes: vectorizing the plurality of second HTTP flows, and then calculate similarities between the plurality of vectorized second HTTP flows and the first alarm traffic. The malicious traffic identification apparatus may first perform vectorization by using a bag of words (BOW) model, and then separately calculate the similarities between the plurality of second HTTP flows and the first alarm traffic by using a cosine similarity in a vector space model (VSM). When measuring a string similarity, vector representations of two generalized requests under a same BOW is obtained, and a cosine distance (similarity) is calculated. The cosine similarity in the vector space model (VSM) may be used for calculating the similarity between the traffic. The vector space model is an algebraic model that represents a text file as an identifier (such as an index) vector. The algebraic model applies to information filtering, information retrieval, indexing, and related sorting.

$$\text{similarity} = \cos(\theta) = \frac{A \cdot B}{\|A\|\|B\|} = \frac{\sum_{i=1}^{n} A_i B_i}{\sqrt{\sum_{i=1}^{n} A_i^2}\sqrt{\sum_{i=1}^{n} B_i^2}}.$$

is a template vector of an alarm flow, and B is a vector of a traceback flow.

Figure 9:
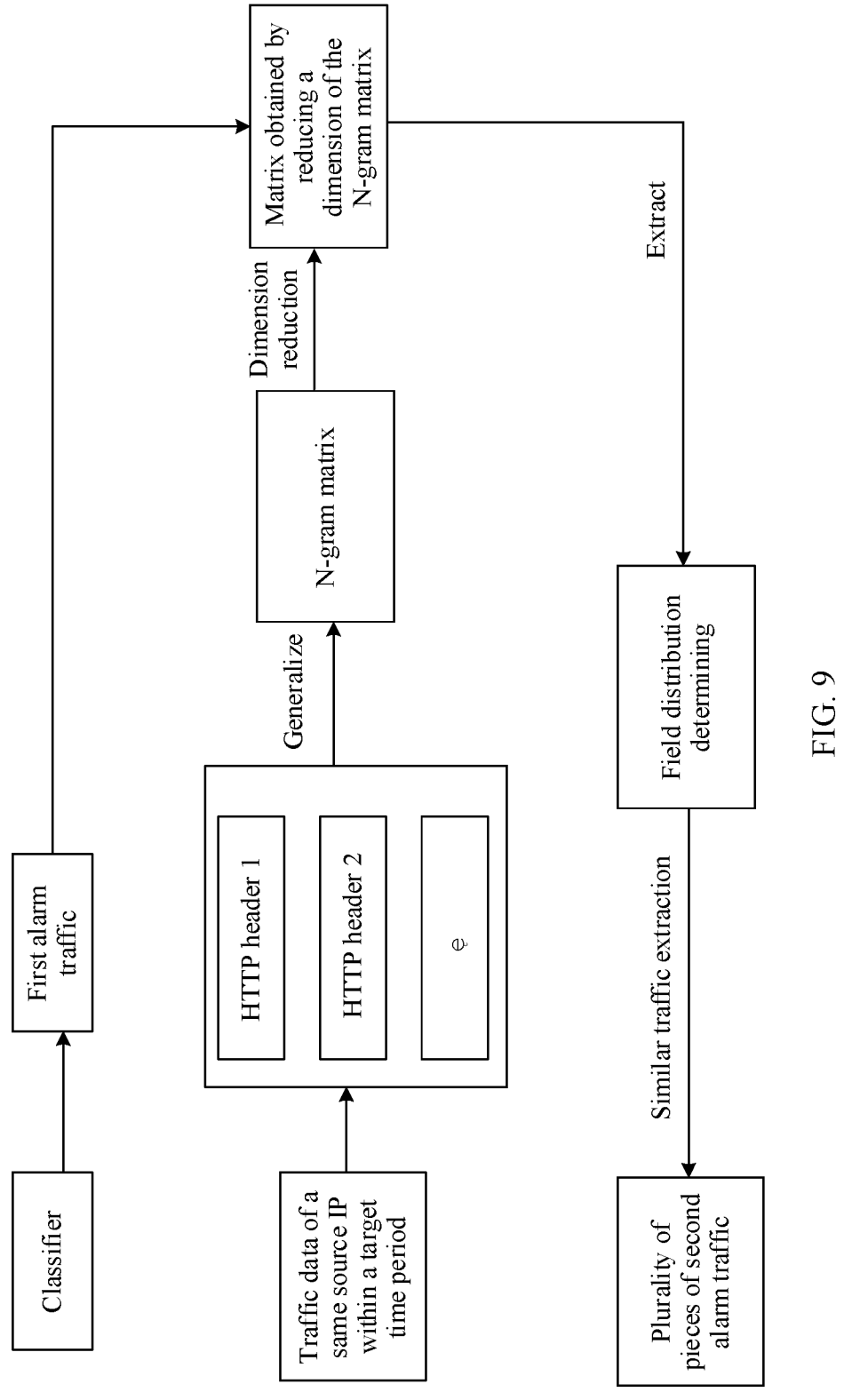
FIG. 9 is a schematic flowchart of tracing back traffic according to a third policy according to an embodiment of this disclosure.

Optionally, the preset policy includes the third policy, and the obtaining, according to a preset policy, a plurality of pieces of second alarm traffic corresponding to the first alarm traffic within a target time period includes: obtaining the IP address and the HTTP header information that are of the first alarm traffic; collecting a plurality of third HTTP flows sent at the IP address within the target time period; performing N-gram processing on an HTTP header corresponding to each of the plurality of third HTTP flows, to obtain a first matrix, where the first matrix includes HTTP header sequence information corresponding to each third HTTP flow; performing dimension reduction on the first matrix, and extracting target HTTP header sequence information that matches the HTTP header information of the first alarm traffic and that is in a dimension-reduced first matrix; and obtaining, as the second alarm traffic based on the target HTTP header sequence information, a third HTTP flow corresponding to the target HTTP header sequence information. FIG. 9 is a schematic flowchart of tracing back traffic according to a third policy according to an embodiment of this disclosure. As shown in FIG. 9, N-gram processing is performed on an HTTP header of an HTTP request of the source IP, that is, HTTP header sequence information in the traffic is extracted, and different values (depending on performance) are respectively obtained for N. A sample-header combination matrix (an HTTP header sequence N-gram matrix) shown in Table 1 is formed. A hash trick is used to perform dimension reduction and extract HTTP flows in a same sequence after dimension reduction.

malicious traffic is further determined based on behavior features of the plurality of pieces of traffic, thereby improving accuracy of malicious traffic identification.

Step S206: Perform feature extraction on the plurality of pieces of second alarm traffic to obtain first feature information.

Figure 10:
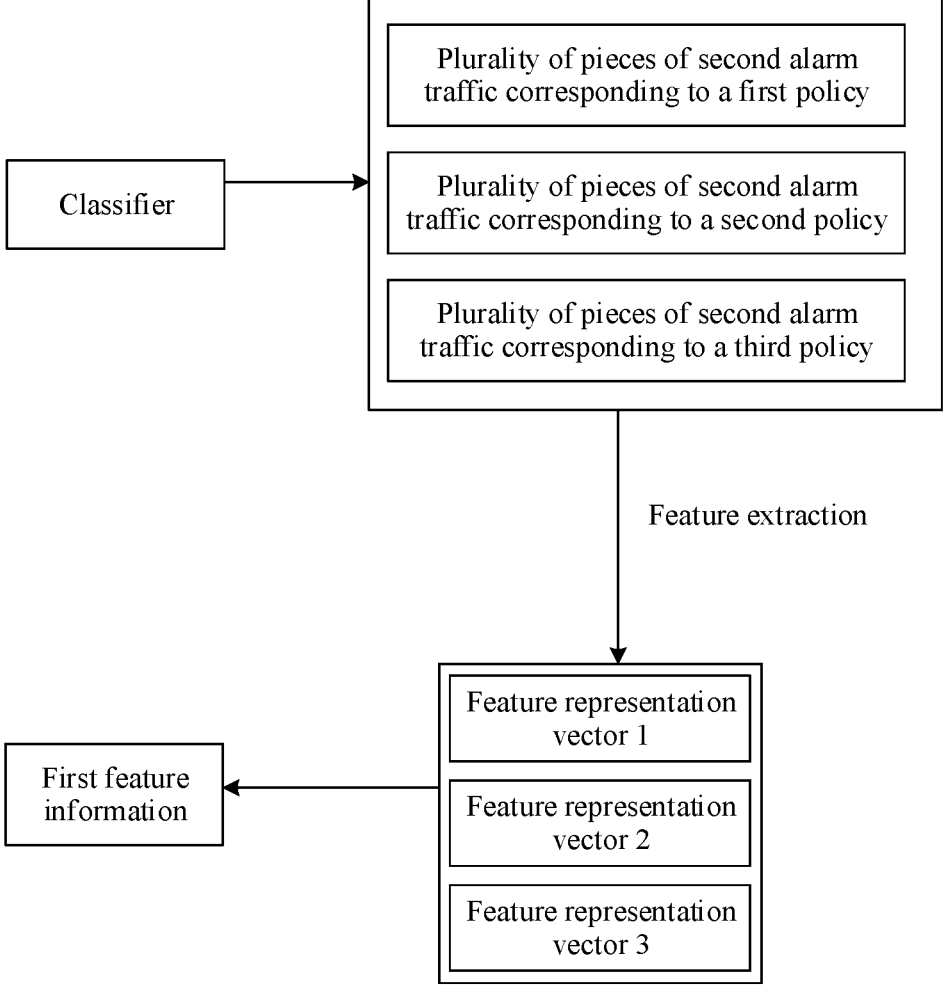
FIG. 10 is a schematic flowchart of a method for obtaining first feature information according to an embodiment of this disclosure.

Specifically, the malicious traffic identification apparatus performs feature extraction the plurality of pieces of second alarm traffic to obtain the first feature information. It may be understood that the HTTP flow obtained according to the foregoing one or more policy traceback methods is input into a next phase for feature extraction. Representation vectors corresponding to the plurality of HTTP flows obtained by using one or more three traceback methods are separately obtained, and the representation vectors are connected into one vector, that is, the first feature information. FIG. 10 is a schematic flowchart of a method for obtaining first feature information according to an embodiment of this disclosure. As shown in FIG. 10, the single-flow classifier obtains the first alarm traffic, that is, a pre-classification result. A plurality of pieces of second alarm traffic (multi-flow data) are tracked back based on the first alarm traffic according to the first policy (that is, UA aggregation), the second policy (that is, traffic template similarity clustering), and/or the third policy (HTTP header N-gram), and feature extraction is performed on the plurality of pieces of second alarm traffic, to obtain feature representation vectors (Vector-traceback) corresponding to all the policies. Then, the feature representation vectors are combined to a multi-flow feature representation vector, that is, the first feature information.

Optionally, the first feature information is a feature representation vector, and the performing feature extraction on

TABLE 1

| | HTTP header sequence N-gram matrix | | | | | | |
| Samples | header n-gram seq 1 | header n-gram seq 2 | header n-gram seq 3 | header n-gram seq 4 | header n-gram seq 5 | header n-gram seq 6 | header n-gram seq 7 |
|---|---|---|---|---|---|---|---|
| sample 1 | 1 | 0 | 0 | 0 | 0 | 0 | 1 |
| sample 2 | 0 | 1 | 0 | 0 | 0 | 0 | 0 |
| sample 3 | 1 | 0 | 0 | 0 | 1 | 0 | 1 |
| sample 4 | 1 | 0 | 0 | 0 | 1 | 0 | 0 |
| . . . | | | | | | | |

As shown in FIG. 9, because a combination matrix has a high dimension, dimension reduction may be performed on the matrix in the hash trick manner, to obtain a matrix obtained after dimension reduction of the N-gram matrix. For example, random conversion is performed on a feature vector x to perform MinHash once, to obtain a hash result, and last b bits of the hash result (which may be represented in binary mode) are obtained. This is a b-bit MinHash process. The process is repeated k times, and each sample can be represented by k*b bits. This greatly reduces time and space requirements of processing. In the method for extracting the HTTP header sequence information from the traffic for traceback (for example, traffic data of the same source IP within the target time period), a plurality of pieces of traffic sent by different applications in a same piece of software may be tracked back, and whether the first alarm traffic is the the plurality of pieces of second alarm traffic to obtain first feature information includes: performing feature extraction on the plurality of pieces of second alarm traffic to obtain behavior feature information corresponding to the plurality of pieces of second alarm traffic, where the behavior feature information includes one or more of a connection behavior feature, a request difference feature, and a request response feature; and obtaining the feature representation vector based on the behavior feature information. When identifying the traffic, the malicious traffic identification apparatus may fully consider a multi-flow network behavior feature of malicious CC communication traffic, to more accurately detect and distinguish malicious traffic on the live network. It should be noted that Table 2 is a multi-flow behavior feature information table provided in this embodiment of this disclosure.

TABLE 2

| Feature category | Feature name | Feature description |
|---|---|---|
| Feature description of a multi-flow model | | |
| Connection behavior feature | Quantity of connection times within a traceback time period | obtained by collecting statistics on a quantity of requests/responses within a specified time period |
| | Connection time interval sequence | obtained by calculating a time difference between every two requests within a specified time period |
| | Connection time interval (max) | obtained by calculating a maximum difference of time between requests within a specified time period |
| | Connection time interval (min) | obtained by calculating a minimum difference of time between requests within a specified time period |
| | Connection time interval average | obtained by calculating an average value of time between requests within a specified time period |
| | Connection time interval variance | obtained by calculating a variance of time between requests within a specified time period |
| | Connection packet size sequence | obtained by recording a size of each packet within a specified time period |
| | Connection packet size (max) | obtained by recording a size of each packet and obtaining a maximum value within a specified time period |
| | Connection packet size (min) | obtained by recording a size of each packet and obtaining a minimum value within a specified time period |
| | Connection packet size average | obtained by recording a size of each packet and obtaining an average value within a specified time period |
| | Connection packet size variance | obtained by recording a size of each packet and obtaining a variance within a specified time period |
| Request difference feature | Request parameter difference | Extract a request parameter and calculate a length variance of the request parameter |
| | Request parameter entropy value | Extract a request parameter value, calculate an information entropy value of the request parameter value, and calculate an average value of information entropy values corresponding to a plurality of flows. If the request parameter value does not exist, set the information entropy value to −1. |
| | Request resource type/Request file type | Extract a suffix of a request file, perform TF-IDF, and use SVD to perform dimension reduction to 10 dimensions. |
| Request and response feature statistics | Proportion of returned packets with a same size | Percentage of a quantity of returned packets with a same length to all returned packets within a specified time period |
| | Return packet size sequence | obtained by recording a size of each packet within a specified time period |

TABLE 2-continued

| Feature category | Feature name | Feature description |
|---|---|---|
| Feature description of a multi-flow model | | |
| | Return packet size (max) | obtained by recording a size of each packet and obtaining a maximum value within a specified time period |
| | Return packet size (min) | obtained by recording a size of each packet and obtaining a minimum value within a specified time period |
| | Return packet size average | obtained by recording a size of each packet and obtaining an average value within a specified time period |

Step S207: Determine, based on the first feature information, whether the first alarm traffic is the malicious traffic.

Specifically, the malicious traffic identification apparatus judges, based on the first feature information, whether the first alarm traffic is the malicious traffic. The first feature information may represent behavior feature information of multi-flow traffic corresponding to the first alarm traffic. Based on the behavior feature information, detection is performed by using the traceback model, to determine whether the first alarm traffic is the malicious traffic. For example, the obtained multi-flow behavior feature information, for example, a vector representation form, is input into the foregoing traceback model (the multi-flow classifier). In addition, to fully utilize a vector feature, a plurality of times of training may be performed in a stacking manner to extract the behavior feature of the vector. In other words, a plurality of detection results can be obtained based on the traceback model. The traceback model may be a pre-trained classification model, and is used to identify whether the traffic is the malicious traffic.

Optionally, the determining, based on the first feature information, whether the first alarm traffic is malicious traffic includes: performing detection based on the first feature information by using a traceback model, to obtain a first detection result; performing detection based on the plurality of pieces of second alarm traffic by using a baseline model, to obtain a second detection result, where the baseline model is a detection model pre-trained based on historical traffic; and determining, based on the first detection result and the second detection result, whether the first alarm traffic is the malicious traffic. Traffic data is accumulated for a time period in a production environment of the live network, a multi-flow feature of the live network traffic is extracted based on the accumulation, and the multi-flow feature is used as training data to construct a single classification model (that is, the baseline model) of historical data of the live network, so that the model can represent a behavior baseline of the live network, thereby identifying traffic that is different from a normal behavior from a perspective of the baseline. In addition, the traceback model may be a pre-trained multi-flow classifier, and is used to identify whether the traffic is the malicious traffic. Then, a first detection result $y_1(x)$ of the traceback model is smoothly integrated with a second detection result $y_2(x)$ of a single-category baseline anomaly detection model pre-trained by using historical traffic, to obtain a final judgment result ( ). A final integration value is obtained by using a decision formula, and finally, whether the first alarm traffic is the malicious traffic is determined based on the judgment result ( ). Specifically, the decision formula is:

$$Y(x) = \text{sigmoid}\left(\frac{a_1 y_1(x) + a_2 y_2(x)}{2}\right),$$

where $$a_n = \ln\left(\frac{1 - E_n}{E_n}\right),$$

$$E_n = \frac{\text{amount(worng predicts)}}{\text{amount(all samples)}}.$$

Figure 11:
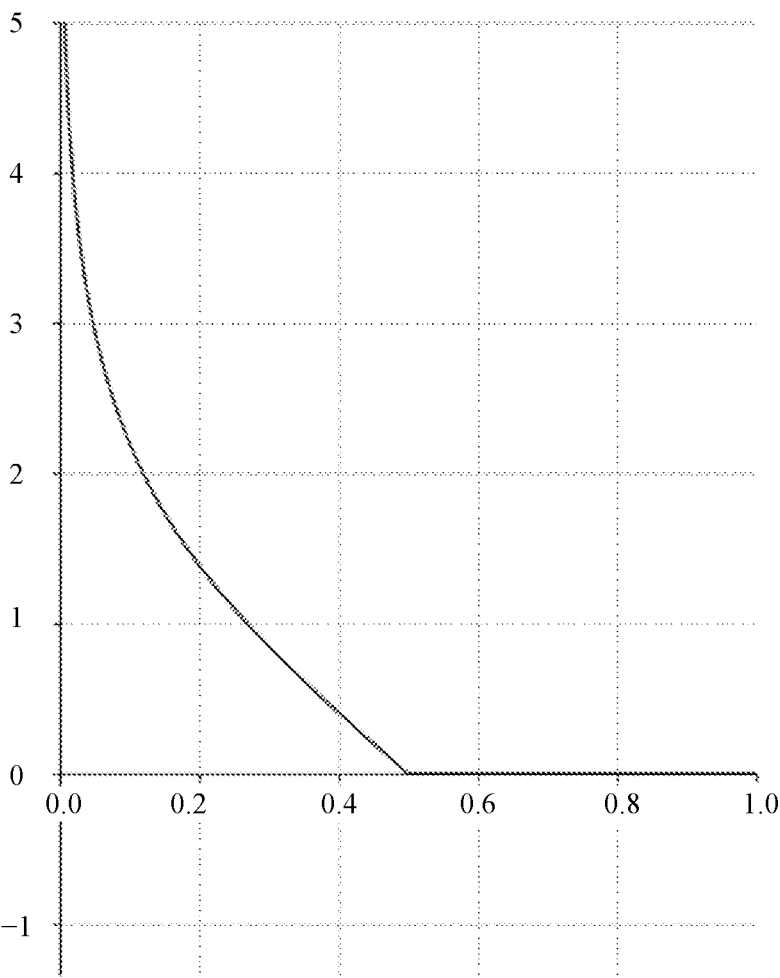
FIG. 11 is a function image in which $E_n$ is an independent variable and $a_n$ is a dependent variable according to an embodiment of this disclosure.

FIG. 11 is a function image in which $E_n$ is an independent variable and an is a dependent variable according to an embodiment of this disclosure, where $E_n \in (0, 1)$. As shown in FIG. 11, when an error rate $E_n$ is larger, $a_n$ extends in a decreasing direction, resulting in a decrease in a judgment weight of a corresponding model. After a weight value is averaged with output values of different models, a smoothing symbol function sigmoid is input to calculate a final mapping value, to obtain output results 0 (a white-list sample label or normal traffic label) and 1 (a black-list sample label or malicious traffic label). In addition, whether the first alarm traffic is the malicious traffic is finally determined by comprehensively considering the first detection result detected by using the traceback model and the second detection result detected by using the baseline model, thereby greatly improving accuracy of malicious traffic identification.

Step S208. If the first alarm traffic is the malicious traffic, perform preset generalization processing on the first alarm traffic to obtain generalized first alarm traffic.

Specifically, if the first alarm traffic is the malicious traffic, the malicious traffic identification apparatus performs preset generalization processing on the first alarm traffic, to obtain the generalized first alarm traffic. It may be understood that, if it is determined that the first alarm traffic is the malicious traffic, a type of the malicious traffic may be further identified.

Step S209: Classify the generalized first alarm traffic, to determine a malicious traffic type that matches the first alarm traffic.

Figure 12:
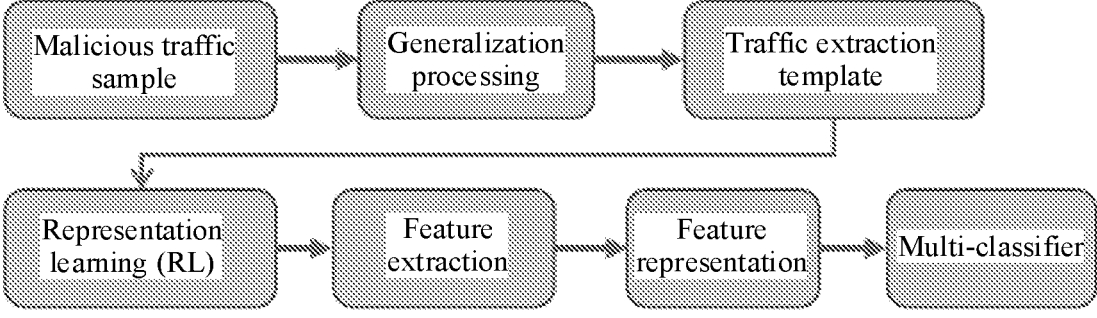
FIG. 12 is a schematic flowchart of determining a type to which malicious traffic belongs according to an embodiment of this disclosure.

Specifically, the malicious traffic identification apparatus classifies the generalized first alarm traffic, to determine the malicious traffic type that matches the first alarm traffic. The malicious traffic identification apparatus classifies the generalized first alarm traffic by using a trained category classification model. A classification model used to identify a category to which the malicious traffic belongs is a multi-family classification model trained by using the feature extracted from the model (the traceback model) in step S207 after generalization processing is performed on communication traffic of a known malicious sample, and is used to determine a family to which the malicious traffic belongs. Therefore, FIG. 12 is a schematic flowchart of determining a type to which malicious traffic belongs according to an embodiment of this disclosure. As shown in FIG. 12, the malicious traffic type matched by the alarm traffic can be determined after the malicious traffic sample passes through generalization processing, traffic template extraction, representation learning, feature extraction, feature identification, and processing of the multi-classifier. That is, in this embodiment of this disclosure, after performing preset generalization processing on the first alarm traffic, the malicious traffic identification apparatus obtains the generalized first alarm traffic, performs feature extraction on the generalized first alarm traffic to obtain a corresponding feature representation vector, and finally inputs the feature representation vector into the multi-family classification model, to identify the type of the malicious traffic.

In implementation of the embodiment of the first aspect, the malicious traffic identification apparatus may trace back, according to a preset policy from a receiving time of a single piece of traffic (that is, the first alarm traffic), a plurality of pieces of traffic (that is, the plurality of pieces of second alarm traffic) that match the single piece of traffic within the target time period. Then, feature extraction is performed on the plurality of pieces of back-traced traffic to obtain feature information, so that the malicious traffic identification apparatus can classify the foregoing single piece of traffic based on the feature information, to determine whether the single piece of traffic is malicious traffic. All similarities between the plurality of pieces of second alarm traffic and the first alarm traffic each are greater than a preset threshold. In this method for classifying the single piece of traffic based on the feature information of the plurality of pieces of traffic that are similar to the single piece of traffic, when identifying the traffic, the malicious traffic identification apparatus can fully consider a multi-flow network behavior feature of malicious CC communication traffic, to more accurately detect and distinguish malicious traffic on a live network. This avoids accidental detection, caused by a complex traffic situation on the live network, of a single HTTP flow in a detection process in the conventional technology. In addition, in this embodiment of this disclosure, communication behavior of traffic is observed from a perspective of multi-flow, a plurality of alarm flows are traced back to different clusters according to one or more methods, statistics collection is performed on feature information of each alarm flow by using a different cluster to which the alarm flow belongs, to determine positivity and negativity based on the feature information (that is, whether the alarm traffic is malicious traffic), thereby eliminating an accidental error. Overall communication behavior of the malicious traffic within a specific time period is observed, so that a malicious sample can be judged from a perspective of behavior. This makes a final multi-flow judgment result more robust and behavioral explainability. In addition, in this embodiment of this disclosure, for multi-flow traffic, whether detection is performed on a feature corresponding to a traffic layer or a feature corresponding to host behavior, richness of basic information is sufficient for the malicious traffic identification apparatus to effectively and accurately identify whether the traffic is the malicious traffic. Therefore, communication traffic of rogue software and communication traffic of malware can be distinguished from a feature of the multi-flow, thereby improving accuracy of malicious traffic identification.

In addition, in an application scenario in which network data identification is performed separately by using the conventional technology and embodiments of this disclosure for 16 million pieces of normal live network data and 10,000 pieces of malicious traffic sample data collected by a campus network X, the following experimental data is obtained.

1. Only a Single-Flow Detection Model in the Conventional Technology is Used.

Table 3 shows a single-flow model performance data table provided in this embodiment of this disclosure. However, it is confirmed based on aspects such as threat intelligence that in actual network running, precision of a detection algorithm may be estimated to be about 80%. (More than 40 flow alarms are confirmed on the campus network X)

TABLE 3

| Single-flow model performance data table | |
| --- | --- |
| Accuracy (Accuracy) | 0.9999664730928924 |
| F1 | 0.9999831782138391 |
| Precision (Precision) | 0.9999728493273421 |
| Retrieval rate (recall) | 0.999993507313716 |

Table 3 shows that for all HTTP communications, an ACC value is above 99.99% and an ROC value is close to 1 (0.99999) in the experimental environment (a test set). The ROC value is generally between 0.5 and 1.0. A larger value indicates higher model judgment accuracy, that is, closer to 1 is better. ROC=0.5 indicates that there is no difference between a predictive ability of the model and a random result. A KS value represents an ability of the model to distinguish between addition and subtraction. A larger KS value indicates better prediction accuracy of the model. Generally, KS>0.2 indicates that the model has better prediction accuracy.

2. The Malicious Traffic Identification Method in this Embodiment of this Disclosure is Used.

Based on a single-layer detection model, multi-flow determining is performed. In the experimental environment, IP aggregation infection behavior on the live network is successfully detected. In all final alarm samples, identification precision of a traceback model on the campus network X reaches 100%. Refer to examples of the malicious traffic detected in Table 4. Two clusters of malicious HTTP flows with IP addresses 166.**..111 and 166..**.191 are detected in Table 4.

TABLE 4

| Malicious traffic sample data | | |
| --- | --- | --- |
| http://arimaexim.com/logo.gif?f5da**=−119187 | 158498 | 166.*.**.111 |
| http://arimaexim.com/logo.gif?faa7**=−8966 | 158025 | 166.*.**.111 |
| http://arimaexim.com/logo.gif?f69c**=−110150 | 158218 | 166.*.**.111 |
| http://www.arimaexim.com/logo.gif?faa7**=−8966 | 158026 | 166.*.**.111 |
| . . . | . . . | . . . |
| http://ampyazilim.com.tr/images/xs2.jpg?cdd**=21164 | 158717 | 166.*.***.191 |
| http://ahmediye.net/xs.jpg?857**=55996 | 158826 | 166.*.***.191 |
| . . . | . . . | . . . |

In conclusion, in this embodiment of this disclosure, first, HTTP traffic of same malware/application communication within a continuous time period may be accurately separated based on a traffic separation method of multi-flow traceback; and second, storage and detection of a large quantity of irrelevant data flows can be effectively reduced during the detection process based on a multi-level detection framework of traceback (single-flow filtering and then multi-flow traceback) (only suspicious traffic at a first layer needs to be detected for tracing back traffic, which accounts for a small proportion), thereby improving analysis efficiency and being more suitable for an enterprise network. In addition, communication traffic of rogue software and communication traffic of malware can be distinguished from a perspective of multi-flow behavior feature based on the traffic separation method of multi-flow traceback.

The method in embodiments of this disclosure is described above in detail. A related apparatus in embodiments of this disclosure is provided below.

Figure 13:
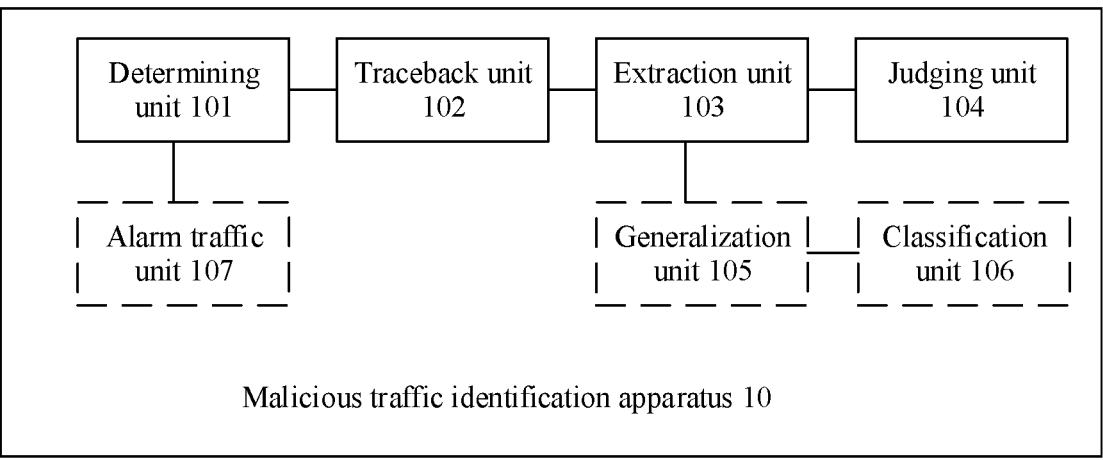
FIG. 13 is a schematic diagram of a structure of a malicious traffic identification apparatus according to an embodiment of this disclosure.

FIG. 13 is a schematic diagram of a structure of a malicious traffic identification apparatus according to an embodiment of this disclosure. A malicious traffic identification apparatus 10 may include a determining unit 101, a traceback unit 102, an extraction unit 103, and a judging unit 104, and may further include a generalization unit 105, a classification unit 106, and an alarm traffic unit 107. Detailed descriptions of the units are as follows.

The determining unit 101 is configured to determine a receiving time of first alarm traffic.

The traceback unit 102 is configured to obtain, according to a preset policy, a plurality of pieces of second alarm traffic corresponding to the first alarm traffic within a target time period, where the target time period is a time period determined based on the receiving time, and a similarity between each of the plurality of pieces of second alarm traffic and the first alarm traffic is greater than a preset threshold.

The extraction unit 103 is configured to perform feature extraction on the plurality of pieces of second alarm traffic to obtain first feature information.

The judging unit 104 is configured to determine, based on the first feature information, whether the first alarm traffic is malicious traffic.

In a possible implementation, the preset policy includes one or more of a first policy, a second policy, and a third policy, the first policy is a policy of obtaining the plurality of pieces of second alarm traffic based on an internet protocol IP address and user agent UA information that are of the first alarm traffic, the second policy is a policy of obtaining the plurality of pieces of second alarm traffic based on the IP address of the first alarm traffic and a preset generalization rule, and the third policy is a policy of obtaining the plurality of pieces of second alarm traffic based on the IP address of the first alarm traffic and hypertext transfer protocol HTTP header information of the first alarm traffic.

In a possible implementation, the preset policy includes the first policy, and the traceback unit 102 is specifically configured to obtain the IP address and the UA information that are of the first alarm traffic; and collect, as the second alarm traffic, an HTTP flow that has same UA information as the first alarm traffic and that is in a plurality of HTTP flows sent at the IP address within the target time period.

In a possible implementation, the preset policy includes the second policy, and the traceback unit 102 is specifically configured to obtain the IP address of the first alarm traffic; collect a plurality of first HTTP flows sent at the IP address within the target time period; performing generalization processing on the plurality of first HTTP flows according to a preset generalization rule, to obtain a plurality of second HTTP flows, where the preset generalization rule is uniformly replacing, by using a preset standard, a target character string corresponding to each of the plurality of first HTTP flows; and obtain, as the second alarm traffic, a target second HTTP flow by screening the plurality of second HTTP flows, where a similarity between the target second HTTP flow and the first alarm traffic is greater than the preset threshold.

In a possible implementation, the preset policy includes the third policy, and the traceback unit 102 is specifically configured to obtain the IP address and the HTTP header information that are of the first alarm traffic; collect a plurality of third HTTP flows sent at the IP address within the target time period; perform N-gram processing on an HTTP header corresponding to each of the plurality of third HTTP flows, to obtain a first matrix, where the first matrix includes HTTP header sequence information corresponding to each third HTTP flow; perform dimension reduction on the first matrix, and extract target HTTP header sequence information that matches the HTTP header information of the first alarm traffic and that is in a dimension-reduced first matrix; and obtain, as the second alarm traffic based on the target HTTP header sequence information, a third HTTP flow corresponding to the target HTTP header sequence information.

In a possible implementation, the first feature information is a feature representation vector, and the extraction unit 103 is specifically configured to perform feature extraction on the plurality of pieces of second alarm traffic to obtain behavior feature information corresponding to the plurality of pieces of second alarm traffic, where the behavior feature information includes one or more of a connection behavior feature, a request difference feature, and a request response feature; and obtain the feature representation vector based on the behavior feature information.

In a possible implementation, the judging unit 104 is specifically configured to: perform detection based on the first feature information by using a traceback model, to obtain a first detection result; perform detection based on the plurality of pieces of second alarm traffic by using a baseline model, to obtain a second detection result, where the baseline model is a detection model pre-trained based on historical traffic; and determine, based on the first detection result and the second detection result, whether the first alarm traffic is the malicious traffic.

In a possible implementation, the apparatus further includes: a generalization unit 105, configured to: if the first alarm traffic is the malicious traffic, perform preset generalization processing on the first alarm traffic to obtain generalized first alarm traffic; and a classification unit 106, configured to classify the generalized first alarm traffic, to determine a malicious traffic type that matches the first alarm traffic.

In a possible implementation, the apparatus further includes an alarm traffic unit 107, and the alarm traffic unit 107 is configured to: receive a plurality of fourth HTTP flows before the receiving time of the first alarm traffic is determined; perform feature extraction on each of the plurality of fourth HTTP flows to obtain a second feature set, where the second feature set includes second feature information respectively corresponding to the plurality of fourth HTTP flows; and obtain the first alarm traffic by screening the plurality of fourth HTTP flows based on the second feature set via a first classification model.

In this embodiment of this disclosure, the second feature information includes manual feature information and/or representation learning feature information, the manual feature information includes one or more of a domain name readability feature, a uniform resource locator URL structure feature, a behavior indication feature, and an HTTP header feature that correspond to the fourth HTTP flow, and the representation learning feature information includes a high-dimensional feature corresponding to the fourth HTTP flow.

It should be noted that for functions of the functional units in the malicious traffic identification apparatus 10 described in embodiments of this disclosure, refer to the related description of step S201 to step S209 in the method embodiment in FIG. 2. Details are not described herein.

Figure 14:
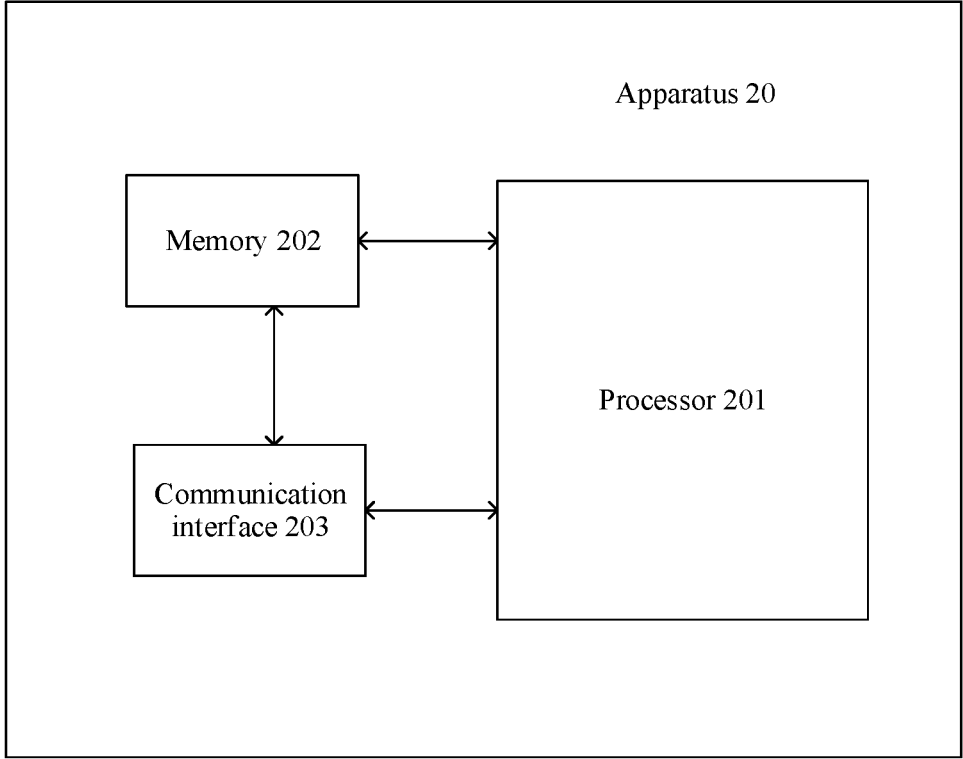
FIG. 14 is a schematic diagram of a structure of another malicious traffic identification apparatus according to an embodiment of this disclosure.

FIG. 14 is a schematic diagram of a structure of another malicious traffic identification apparatus according to an embodiment of this disclosure. The apparatus 20 includes at least one processor 201, at least one memory 202, and at least one communication interface 203. In addition, the device may further include a general-purpose component such as an antenna. Details are not described herein.

The processor 201 may be a general-purpose central processing unit (CPU), a microprocessor, an application-specific integrated circuit (ASIC), or one or more integrated circuits for controlling program execution of the foregoing solutions.

The communication interface 203 is configured to communicate with another device or a communication network, such as the Ethernet, a radio access network (RAN), a core network, or a wireless local area network (WLAN).

The memory 202 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that can be used to carry or store expected program code in a form of an instruction or a data structure and can be accessed by a computer, but is not limited thereto. The memory may exist independently, and is connected to the processor through the bus. The memory may alternatively be integrated with the processor.

The memory 202 is configured to store application program code for executing the foregoing solutions, and the processor 201 controls execution. The processor 201 is configured to execute the application program code stored in the memory 202.

The code stored in the memory 202 may execute the malicious traffic identification method provided in FIG. 2, for example, determining a receiving time of first alarm traffic; obtaining, according to a preset policy, a plurality of pieces of second alarm traffic corresponding to the first alarm traffic within a target time period, where the target time period is a time period determined based on the receiving time, and a similarity between each of the plurality of pieces of second alarm traffic and the first alarm traffic is greater than a preset threshold; performing feature extraction on the plurality of pieces of second alarm traffic to obtain first feature information; and determining, based on the first feature information, whether the first alarm traffic is malicious traffic.

It should be noted that for functions of the functional units in the malicious traffic identification apparatus 20 described in embodiments of this disclosure, refer to the related description of step S201 to step S209 in the method embodiment in FIG. 2. Details are not described herein.

In the foregoing embodiments, the description of each embodiment has respective focuses. For a part that is not described in detail in an embodiment, refer to related descriptions in other embodiments.

It should be noted that, for brief description, the foregoing method embodiments are represented as a series of actions. However, persons skilled in the art should appreciate that this disclosure is not limited to the described order of the actions, because according to this disclosure, some steps may be performed in other orders or simultaneously. It should be further appreciated by persons skilled in the art that embodiments described in this specification all belong to example embodiments, and the involved actions and modules are not necessarily required by this disclosure.

In the several embodiments provided in this disclosure, it should be understood that the disclosed apparatus may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The foregoing units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of a software functional unit.

When the foregoing integrated unit is implemented in the form of a software functional unit and sold or used as an independent product, the integrated unit may be stored in a computer-readable storage medium. Based on such an understanding, the technical solutions of this disclosure essentially, or the part contributing to the conventional technology, or all or some of the technical solutions may be implemented in a form of a software product. The computer software product is stored in a storage medium and includes several instructions for instructing a computer device (which may be a personal computer, a server, or a network device, and may be specifically a processor in the computer device) to perform all or some of the steps of the method described in embodiments of this disclosure. The foregoing storage medium includes any medium that can store program code, such as a USB flash drive, a removable hard disk, a magnetic disk, an optical disc, a read-only memory (ROM), or a random access memory (RAM).

The foregoing embodiments are merely intended for describing the technical solutions of this disclosure other than limiting this disclosure. Although this disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this disclosure.

What is claimed is:

1. A malicious traffic identification method comprising:
determining a receiving time of first alarm traffic;
obtaining, according to a preset policy, a plurality of pieces of second alarm traffic corresponding to the first alarm traffic within a target time period,
  wherein the target time period is a time period determined based on the receiving time, and
  wherein a similarity between each of the plurality of pieces of second alarm traffic and the first alarm traffic is greater than a preset threshold;
performing feature extraction on the plurality of pieces of second alarm traffic to obtain first feature information; and
determining, based on the first feature information, whether the first alarm traffic is malicious traffic,
  wherein the preset policy comprises one or more of a first policy, a second policy, or a third policy,
  wherein the first policy is a policy of obtaining the plurality of pieces of second alarm traffic based on an internet protocol (IP) address of the first alarm traffic and user agent (UA) information of the first alarm traffic,
  wherein the second policy is a policy of obtaining the plurality of pieces of second alarm traffic based on the IP address of the first alarm traffic and a preset generalization rule, and
  wherein the third policy is a policy of obtaining the plurality of pieces of second alarm traffic based on the IP address of the first alarm traffic and hypertext transfer protocol (HTTP) header information of the first alarm traffic; and
based on the preset policy being the first policy, obtaining the plurality of pieces of the second alarm traffic corresponding to the first alarm traffic within the target time period comprises:
  obtaining the IP address of the first alarm traffic and the UA information of the first alarm traffic; and
  collecting, as the plurality of pieces of the second alarm traffic, a HTTP flow having same UA information as the first alarm traffic, wherein the HTTP flow is among a plurality of HTTP flows sent at the IP address within the target time period.

2. The method according to claim 1, wherein based on the preset policy being the second policy, obtaining the plurality of pieces of the second alarm traffic corresponding to the first alarm traffic within the target time period comprises:
obtaining the IP address of the first alarm traffic;
collecting a plurality of first HTTP flows sent at the IP address of the first alarm traffic within the target time period;
performing generalization processing on the plurality of first HTTP flows, according to the preset generalization rule, to obtain a plurality of second HTTP flows,
  wherein the preset generalization rule is uniformly replacing, by using a preset standard, a target character string corresponding to each of the plurality of first HTTP flows; and
obtaining, as the plurality of pieces of the second alarm traffic, a target second HTTP flow by screening the plurality of second HTTP flows, wherein a similarity between the target second HTTP flow and the first alarm traffic is greater than the preset threshold.

3. The method according to claim 1, wherein based on the preset policy being the third policy, obtaining the plurality of pieces of the second alarm traffic corresponding to the first alarm traffic within the target time period comprises:

obtaining the IP address of the first alarm traffic and the HTTP header information of the first alarm traffic;

collecting a plurality of third HTTP flows sent at the IP address of the first alarm traffic within the target time period;

performing N-gram processing on an HTTP header corresponding to each of the plurality of third HTTP flows, to obtain a first matrix comprising HTTP header sequence information corresponding to each third HTTP flow of the plurality of third HTTP flows;

performing dimension reduction on the first matrix, and extracting target HTTP header sequence information that matches the HTTP header information of the first alarm traffic and is in a dimension-reduced first matrix; and obtaining, as the plurality of pieces of the second alarm traffic based on the target HTTP header sequence information, a third HTTP flow corresponding to the target HTTP header sequence information.

4. The method according to claim 1, wherein the first feature information is a feature representation vector, and performing the feature extraction on the plurality of pieces of second alarm traffic to obtain the first feature information comprises:

performing the feature extraction on the plurality of pieces of second alarm traffic to obtain behavior feature information corresponding to the plurality of pieces of second alarm traffic, wherein the behavior feature information comprises one or more of a connection behavior feature, a request difference feature, and a request response feature; and obtaining the feature representation vector based on the behavior feature information.

5. The method according to claim 1, wherein determining whether the first alarm traffic is the malicious traffic comprises:

performing detection, based on the first feature information by using a traceback model, to obtain a first detection result;

performing detection, based on the plurality of pieces of second alarm traffic by using a baseline model, to obtain a second detection result, wherein the baseline model is a detection model pre-trained based on historical traffic; and determining, based on the first detection result and the second detection result, whether the first alarm traffic is the malicious traffic.

6. The method according to claim 1, further comprising:

based on the first alarm traffic being the malicious traffic, performing preset generalization processing on the first alarm traffic to obtain generalized first alarm traffic; and classifying the generalized first alarm traffic to determine a malicious traffic type that matches the first alarm traffic.

7. The method according to claim 1, wherein before determining the receiving time of the first alarm traffic, the method further comprises:

receiving the plurality of HTTP flows;

performing feature extraction on each of the plurality of HTTP flows to obtain a second feature set comprising second feature information corresponding to the plurality of HTTP flows; and obtaining the first alarm traffic by screening the plurality of HTTP flows based on the second feature set via a first classification model.

8. The method according to claim 7, wherein the second feature information comprises manual feature information and/or representation learning feature information, wherein the manual feature information comprises one or more of a domain name readability feature, a uniform resource locator (URL) structure feature, a behavior indication feature, and an HTTP header feature that correspond to a HTTP flow, and wherein the representation learning feature information comprises a high-dimensional feature corresponding to a fourth flow.

9. A service device comprising a processor and a memory, wherein the memory is configured to store malicious traffic identification program code, and the processor is configured to invoke the malicious traffic identification program code to perform at least the following operations:

determining a receiving time of first alarm traffic;

obtaining, according to a preset policy, a plurality of pieces of second alarm traffic corresponding to the first alarm traffic within a target time period, wherein the target time period is a time period determined based on the receiving time, and wherein a similarity between each of the plurality of pieces of second alarm traffic and the first alarm traffic is greater than a preset threshold;

performing feature extraction on the plurality of pieces of second alarm traffic to obtain first feature information; and determining, based on the first feature information, whether the first alarm traffic is malicious traffic, wherein the preset policy comprises one or more of a first policy, a second policy, or a third policy, wherein the first policy is a policy of obtaining the plurality of pieces of second alarm traffic based on an internet protocol (IP) address of the first alarm traffic and user agent (UA) information of the first alarm traffic, wherein the second policy is a policy of obtaining the plurality of pieces of second alarm traffic based on the IP address of the first alarm traffic and a preset generalization rule, and wherein the third policy is a policy of obtaining the plurality of pieces of second alarm traffic based on the IP address of the first alarm traffic and hypertext transfer protocol (HTTP) header information of the first alarm traffic; and based on the preset policy being the first policy, obtaining, according to the preset policy, the plurality of pieces of second alarm traffic corresponding to the first alarm traffic within the target time period comprises:

obtaining the IP address of the first alarm traffic and the UA information of the first alarm traffic; and collecting, as the plurality of pieces of the second alarm traffic, an HTTP flow that has same UA information as the first alarm traffic, wherein the HTTP flow is among a plurality of HTTP flows sent at the IP address within the target time period.

10. The service device according to claim 9, wherein based on the preset policy being the second policy, obtaining, according to the preset policy, the plurality of pieces of second alarm traffic corresponding to the first alarm traffic within a target time period comprises:

obtaining the IP address of the first alarm traffic;

collecting a plurality of first HTTP flows sent at the IP address of the first alarm traffic within the target time period;

performing generalization processing on the plurality of first HTTP flows according to the preset generalization rule, to obtain a plurality of second HTTP flows, wherein the preset generalization rule is uniformly replacing, by using a preset standard, a target character string corresponding to each of the plurality of first HTTP flows; and obtaining, as the plurality of pieces of the second alarm traffic, a target second HTTP flow by screening the plurality of second HTTP flows, wherein a similarity between the target second HTTP flow and the first alarm traffic is greater than the preset threshold.

11. The service device according to claim 9, wherein based on the preset policy being the third policy, obtaining the plurality of pieces of the second alarm traffic corresponding to the first alarm traffic within the target time period comprises:

obtaining the IP address of the first alarm traffic and the HTTP header information of the first alarm traffic;

collecting a plurality of third HTTP flows sent at the IP address of the first alarm traffic within the target time period;

performing N-gram processing on an HTTP header corresponding to each of the plurality of third HTTP flows, to obtain a first matrix comprising HTTP header sequence information corresponding to each third HTTP flow of the plurality of third HTTP flows;

performing dimension reduction on the first matrix, and extracting target HTTP header sequence information that matches the HTTP header information of the first alarm traffic and is in a dimension-reduced first matrix; and obtaining as the plurality of pieces of the second alarm traffic, based on the target HTTP header sequence information, a third HTTP flow corresponding to the target HTTP header sequence information.

12. The service device according to claim 9, wherein the first feature information is a feature representation vector, and performing the feature extraction on the plurality of pieces of the second alarm traffic to obtain the first feature information comprises:

performing the feature extraction on the plurality of pieces of second alarm traffic to obtain behavior feature information corresponding to the plurality of pieces of second alarm traffic, wherein the behavior feature information comprises one or more of a connection behavior feature, a request difference feature, and a request response feature; and obtaining the feature representation vector based on the behavior feature information.

13. The service device according to claim 9, wherein determining whether the first alarm traffic is the malicious traffic comprises:

performing detection, based on the first feature information and by using a traceback model, to obtain a first detection result;

performing detection, based on the plurality of pieces of second alarm traffic and by using a baseline model, to obtain a second detection result, wherein the baseline model is a detection model pre-trained based on historical traffic; and determining, based on the first detection result and the second detection result, whether the first alarm traffic is the malicious traffic.

14. A non-transitory computer-readable storage medium storing a computer program and, when the computer program is executed by a processor, the processor is caused to perform at least the following operations:

determining a receiving time of first alarm traffic;

obtaining, according to a preset policy, a plurality of pieces of second alarm traffic corresponding to the first alarm traffic within a target time period, wherein the target time period is a time period determined based on the receiving time, and wherein a similarity between each of the plurality of pieces of second alarm traffic and the first alarm traffic is greater than a preset threshold;

performing feature extraction on the plurality of pieces of second alarm traffic to obtain first feature information; and determining, based on the first feature information, whether the first alarm traffic is malicious traffic; and wherein the preset policy comprises one or more of a first policy, a second policy, or a third policy, wherein the first policy is a policy of obtaining the plurality of pieces of second alarm traffic based on an internet protocol (IP) address of the first alarm traffic and user agent (UA) information of the first alarm traffic, wherein the second policy is a policy of obtaining the plurality of pieces of second alarm traffic based on the IP address of the first alarm traffic and a preset generalization rule, and wherein the third policy is a policy of obtaining the plurality of pieces of second alarm traffic based on the IP address of the first alarm traffic and hypertext transfer protocol (HTTP) header information of the first alarm traffic; and based on the preset policy being the first policy, obtaining, according to the preset policy, the plurality of pieces of second alarm traffic corresponding to the first alarm traffic within the target time period comprises:

obtaining the IP address of the first alarm traffic and the UA information of the first alarm traffic; and collecting, as the plurality of pieces of the second alarm traffic, an HTTP flow having same UA information as the first alarm traffic, wherein the HTTP flow is among a plurality of HTTP flows sent at the IP address within the target time period.

15. The non-transitory computer-readable storage medium according to claim 14, wherein based on the preset policy being the second policy, obtaining according to the preset policy, the plurality of pieces of second alarm traffic corresponding to the first alarm traffic within the target time period comprises:

obtaining the IP address of the first alarm traffic;

collecting a plurality of first HTTP flows sent at the IP address of the first alarm traffic within the target time period;

performing generalization processing on the plurality of first HTTP flows according to the preset generalization rule, to obtain a plurality of second HTTP flows, wherein the preset generalization rule is uniformly replacing, by using a preset standard, a target character string corresponding to each of the plurality of first HTTP flows; and obtaining, as the plurality of pieces of the second alarm traffic, a target second HTTP flow by screening the plurality of second HTTP flows, wherein a similarity between the target second HTTP flow and the first alarm traffic is greater than the preset threshold.

16. The non-transitory computer-readable storage medium according to claim 14, wherein based on the preset policy being the third policy, obtaining the plurality of pieces of the second alarm traffic corresponding to the first alarm traffic within the target time period comprises:

obtaining the IP address of the first alarm traffic and the HTTP header information of the first alarm traffic;

collecting a plurality of third HTTP flows sent at the IP address of the first alarm traffic within the target time period;

performing N-gram processing on an HTTP header corresponding to each of the plurality of third HTTP flows to obtain a first matrix comprising HTTP header sequence information corresponding to each third HTTP flow of the plurality of third HTTP flows;

performing dimension reduction on the first matrix, and extracting target HTTP header sequence information that matches the HTTP header information of the first alarm traffic and is in a dimension-reduced first matrix; and obtaining as the plurality of pieces of the second alarm traffic, based on the target HTTP header sequence information, a third HTTP flow corresponding to the target HTTP header sequence information.

17. The non-transitory computer-readable storage medium according to claim 14, wherein the first feature information is a feature representation vector, and performing the feature extraction on the plurality of pieces of the second alarm traffic to obtain the first feature information comprises:

performing the feature extraction on the plurality of pieces of second alarm traffic to obtain behavior feature information corresponding to the plurality of pieces of second alarm traffic, wherein the behavior feature information comprises one or more of a connection behavior feature, a request difference feature, and a request response feature; and obtaining the feature representation vector based on the behavior feature information.

18. The non-transitory computer-readable storage medium according to claim 14, wherein determining whether the first alarm traffic is the malicious traffic comprises:

performing detection, based on the first feature information and by using a traceback model, to obtain a first detection result;

performing detection, based on the plurality of pieces of second alarm traffic and by using a baseline model, to obtain a second detection result, wherein the baseline model is a detection model pre-trained based on historical traffic; and determining, based on the first detection result and the second detection result, whether the first alarm traffic is the malicious traffic.

19. The non-transitory computer-readable storage medium according to claim 14, further comprising:

based on the first alarm traffic being the malicious traffic, performing preset generalization processing on the first alarm traffic to obtain generalized first alarm traffic; and classifying the generalized first alarm traffic to determine a malicious traffic type that matches the first alarm traffic.

20. The non-transitory computer-readable storage medium according to claim 14, wherein before determining the receiving time of the first alarm traffic, further comprising:

receiving the plurality of HTTP flows;

performing feature extraction on each of the plurality of HTTP flows to obtain a second feature set comprising second feature information corresponding to the plurality of HTTP flows; and obtaining the first alarm traffic by screening the plurality of HTTP flows based on the second feature set via a first classification model.

* * * * *